US009100367B2

(12) United States Patent
Akashika et al.

(10) Patent No.: US 9,100,367 B2
(45) Date of Patent: *Aug. 4, 2015

(54) CONTROL SYSTEM AND CONTROL METHOD, METHOD AND APPARATUS FOR PROCESSING INFORMATION, INFORMATION PROCESSING TERMINAL AND METHOD THEREOF, STORAGE MEDIUM, AND PROGRAM

(75) Inventors: Hideki Akashika, Tokyo (JP); Takuya Oshima, Tokyo (JP); Tadashi Suzuki, Tokyo (JP); Atsushi Miura, Kanagawa (JP); Toyokazu Ota, Tokyo (JP); Yoshiaki Hirano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 261 days.

This patent is subject to a terminal disclaimer.

(21) Appl. No.: 13/279,927

(22) Filed: Oct. 24, 2011

(65) Prior Publication Data

US 2012/0042043 A1 Feb. 16, 2012

Related U.S. Application Data

(63) Continuation of application No. 12/509,102, filed on Jul. 24, 2009, now Pat. No. 8,065,420, which is a continuation of application No. 10/714,869, filed on Nov. 18, 2003, now Pat. No. 7,603,465.

(30) Foreign Application Priority Data

Dec. 2, 2002 (JP) ................................. 2002-349994

(51) Int. Cl.
*G06F 21/34* (2013.01)
*H04L 29/08* (2006.01)
*H04L 29/06* (2006.01)

(52) U.S. Cl.
CPC .......... *H04L 67/025* (2013.01); *H04L 63/0853* (2013.01); *H04L 67/125* (2013.01)

(58) Field of Classification Search
CPC ......................... H04L 67/125; H04L 63/0853
USPC .................................. 709/208, 223, 224, 227
See application file for complete search history.

(56) References Cited

U.S. PATENT DOCUMENTS 4,454,509 A 6/1984 Buennagel et al.
4,594,591 A 6/1986 Burke
(Continued)

FOREIGN PATENT DOCUMENTS

WO WO 95/20281 7/1995

OTHER PUBLICATIONS

Microsoft, Microsoft Computer Dictionary, 2002, Microsoft Press, 5th Ed., p. 214.

*Primary Examiner* — Aaron Strange
(74) *Attorney, Agent, or Firm* — Oblon, McClelland, Maier & Neustadt, L.L.P.

(57) ABSTRACT

A client (such as a PC, portable telephone, PDA, electrical appliances), to which a device such as a IC card is connected, starts a handshake protocol to request a server to start communication. When communication is established via the handshake protocol, the initiative of communication is transferred to the server, and the state changes into a neutral state. In this neutral state, a control packet including a particular number of messages and a finished message is transmitted from the server to the client. If the client receives the control packet, the client performs a process according to the messages included in the control packet. This makes it possible to remotely control a device via a network in a highly reliable and efficient manner.

15 Claims, 24 Drawing Sheets

(56) References Cited

U.S. PATENT DOCUMENTS

| | | |
|---|---|---|
| 4,761,780 A | 8/1988 | Bingham et al. |
| 4,985,895 A | 1/1991 | Pelkey |
| 5,886,647 A | 3/1999 | Badger et al. |
| 5,898,835 A | 4/1999 | Truong |
| 6,031,990 A | 2/2000 | Sivakumar et al. |
| 6,035,264 A | 3/2000 | Donaldson et al. |
| 6,094,221 A * | 7/2000 | Andersion ................. 348/231.6 |
| 6,128,555 A * | 10/2000 | Hanson et al. .................. 701/13 |
| 6,144,848 A | 11/2000 | Walsh et al. |
| 6,182,149 B1 | 1/2001 | Nessett et al. |
| 6,226,744 B1 * | 5/2001 | Murphy et al. ................... 726/5 |
| 6,236,332 B1 | 5/2001 | Conkright et al. |
| 6,374,298 B2 | 4/2002 | Tanno |
| 6,516,427 B1 | 2/2003 | Keyes et al. |
| 6,553,422 B1 | 4/2003 | Nelson |
| 6,597,393 B2 | 7/2003 | Kato et al. |
| 6,625,147 B1 | 9/2003 | Yokoyama et al. |
| 6,782,426 B1 * | 8/2004 | Kuroshima et al. ........... 709/229 |
| 6,941,285 B2 * | 9/2005 | Sarcanin .......................... 705/67 |
| 7,007,070 B1 | 2/2006 | Hickman |
| 7,130,888 B1 | 10/2006 | Hickman et al. |
| 7,296,187 B1 * | 11/2007 | Fritz et al. ....................... 714/31 |
| 2002/0080782 A1 | 6/2002 | Dick et al. |
| 2002/0095480 A1 * | 7/2002 | Drummond et al. .......... 709/218 |
| 2002/0122205 A1 | 9/2002 | Gauthier |
| 2002/0143954 A1 | 10/2002 | Aiken et al. |
| 2003/0014372 A1 * | 1/2003 | Wheeler et al. ................. 705/71 |
| 2004/0054789 A1 | 3/2004 | Breh et al. |
| 2005/0012960 A1 | 1/2005 | Eden et al. |
| 2006/0168260 A1 | 7/2006 | Hinde et al. |

* cited by examiner

FIG. 7

| MESSAGE NAME | HANDSHAKE PROTOCOL | |
|---|---|---|
| | DESCRIPTION | DATA PART |
| FINISHED | END OF SUB-PROTOCOL | NONE |
| WARNING | WARNING | WARNING MESSAGE: CHARACTER STRING |
| CLIENT_HELLO | START OF TRANSMISSION OF HANDSHAKE DATA ADDRESSED TO SERVER | NONE |
| CLIENT_HELLO_DONE | END OF TRANSMISSION OF HANDSHAKE DATA ADDRESSED TO SERVER | NONE |
| SERVER_HELLO | START OF TRANSMISSION OF HANDSHAKE DATA ADDRESSED TO CLIENT | NONE |
| SERVER_HELLO_DONE | END OF TRANSMISSION OF HANDSHAKE DATA ADDRESSED TO CLIENT | NONE |
| DEVICES | NOTICE OF DEVICE LIST | •DEVICE ID<br>•PERMISSION<br>•TYPE NAME LENGTH<br>•TYPE NAME<br>•DEVICE NAME LENGTH<br>•DEVICE NAME |

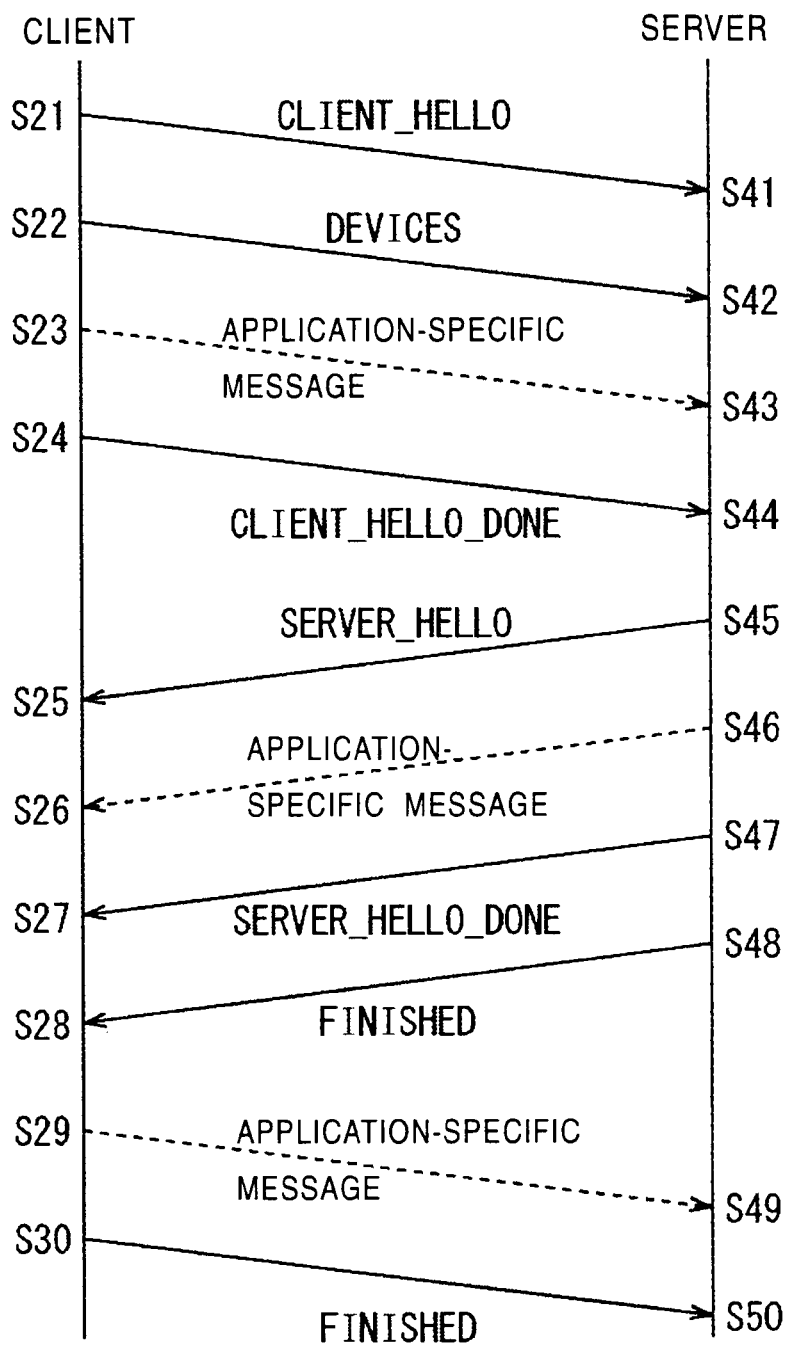

FIG. 9

FAREWELL PROTOCOL

| MESSAGE NAME | DESCRIPTION | DATA PART |
|---|---|---|
| FINISHED | END OF SUB-PROTOCOL | NONE |
| WARNING | WARNING | WARNING MESSAGE: CHARACTER STRING |
| CLIENT_GOOD_BYE | START OF TRANSMISSION OF FAREWELL DATA ADDRESSED TO SERVER | NONE |
| CLIENT_GOOD_BYE_DONE | END OF TRANSMISSION OF FAREWELL DATA ADDRESSED TO SERVER | NONE |
| SERVER_GOOD_BYE | START OF TRANSMISSION OF FAREWELL DATA ADDRESSED TO CLIENT | NONE |
| SERVER_GOOD_BYE_DONE | END OF TRANSMISSION OF FAREWELL DATA ADDRESSED TO CLIENT | NONE |
| RETURN_CODE | NOTICE OF SERVER END CODE | END CODE |

FIG. 11

| MESSAGE NAME | ERROR PROTOCOL | |
|---|---|---|
| | DESCRIPTION | DATA PART |
| FINISHED | END OF SUB-PROTOCOL | NONE |
| WARNING | WARNING | WARNING MESSAGE: CHARACTER STRING |
| PACKET_FORMAT_ERROR | FORMAT ERROR | ERROR MESSAGE: CHARACTER STRING |
| ILLEGAL_STATE_ERROR | ILLEGAL STATE ERROR DETECTED | ERROR MESSAGE: CHARACTER STRING |
| UNEXPECTED_ERROR | UNEXPECTED ERROR OCCURRED | ERROR MESSAGE: CHARACTER STRING |

FIG. 14

| | UPDATE ENTITY PROTOCOL | |
|---|---|---|
| MESSAGE NAME | DESCRIPTION | DATA PART |
| FINISHED | END OF PACKET | NONE |
| WARNING | WARNING | WARNING MESSAGE: CHARACTER STRING |
| SET_PROPERTY | SET PROPERTY OF CLIENT DEVICE<br>RESPONSE: PROPERTY_SET<br>WHEN FAILED: TERMINATE | · PROPERTY NAME LENGTH<br>· PROPERTY NAME<br>· PROPERTY LENGTH<br>· PROPERTY |
| PROPERTY_SET | RESPONSE TO PROPERTY_SET | SUCCESS FLAG |
| GET_PROPERTY | GET PROPERTY OF CLIENT DEVICE<br>RESPONSE: PROPERTY_SET<br>WHEN FAILED: TERMINATE | · PROPERTY NAME LENGTH<br>· PROPERTY NAME |
| PROPERTY | RESPONSE TO GET_PROPERTY | · PROPERTY LENGTH<br>· PROPERTY |
| SET_NETWORK_<br>TIMEOUT | SET NETWORK TIMEOUT VALUE OF CLIENT<br>RESPONSE: NONE<br>WHEN FAILED: CONTINUE | · TIMEOUT VALUE (msec) |

| APPLICATION DATA TRANSFER PROTOCOL ||
|---|---|
| MASSAGE NAME | DESCRIPTION |
| FINISHED | END OF PACKET |
| WARNING | WARNING |

FIG. 18

| | OPERATE ENTITY PROTOCOL | |
|---|---|---|
| MESSAGE NAME | DESCRIPTION | DATA PART |
| FINISHED | END OF PACKET | NONE |
| WARNING | WARNING | WARNING MESSAGE: CHARACTER STRING |
| UPDATE_VIEW | UPDATE OF VIEW<br>RESPONSE: VIEW_UPDATED<br>WHEN FAILED: TERMINATE | NONE |
| VIEW_UPDATED | RESPONSE TO UPDATE_VIEW | SUCCESS FLAG |
| BEGIN_DATA_INPUT | BEGIN DATA INPUT<br>RESPONSE: END_DATA_INPUT<br>WHEN FAILED: TERMINATE | NONE |
| END_DATA_INPUT | RESPONSE TO BEGIN_DATA_INPUT | • SUCCESS FLAG<br>• PROPERTY NAME LENGTH<br>• PROPERTY NAME<br>• PROPERTY LENGTH<br>• PROPERTY |
| OPERATE_DEVICE | OPERATE CLIENT DEVICE<br>RESPONSE: DEVICE_RESPONSE<br>WHEN FAILED: TERMINATE | • NUMBER OF CHARACTERS OF OPERATION NAME<br>• OPERATION NAME<br>• PARAMETER LENGTH<br>• PARAMETER |
| DEVICE_RESPONCE | RESPONSE TO DEVICE OPERATION | • RESPONSE LENGTH<br>• RESPONSE |
| PLAY_SOUND | PRODUCE SOUND CORRESPONDING TO PHYSICAL NAME SPECIFIED BY CLIENT<br>RESPONSE: NONE<br>WHEN FAILED: CONTINUE | PHYSICAL NAME OF SOUND: CHARACTER STRING |

CONTROL SYSTEM AND CONTROL METHOD, METHOD AND APPARATUS FOR PROCESSING INFORMATION, INFORMATION PROCESSING TERMINAL AND METHOD THEREOF, STORAGE MEDIUM, AND PROGRAM

CROSS-REFERENCE TO RELATED APPLICATIONS

This application is a continuation of and is based upon and claims the benefit of priority under 35 U.S.C. §120 for U.S. Ser. No. 12/509,102, filed Jul. 24, 2009, which is a continuation of U.S. Ser. No. 10/714,869, filed Nov. 18, 2003, the entire contents of this application is incorporated herein by reference. U.S. Ser. No. 10/714,869 claims the benefit of priority under 35 U.S.C. §119 from Japanese Patent Application No. 2002-349994, filed on Dec. 2, 2002.

BACKGROUND OF THE INVENTION

1. Field of the Invention

The present invention relates to a control system and a control method, an information processing method and an information processing apparatus, an information processing terminal and a method for an information processing terminal, a storage terminal, and a program. More particularly, the present invention relates to a control system and a control method, an information processing method and an information processing apparatus, an information processing terminal and a method for an information processing terminal, a storage terminal, and a program, for controlling a device connected via a network in a more reliable and more efficient manner.

2. Description of the Related Art

In recent years, various systems have been proposed for controlling a device installed at a remote location.

One of such systems is disclosed in Japanese Unexamined Patent Application Publication No. 2000-184081. In this system, home electric appliances installed in a home, such as an air conditioner or a video recorder, are controlled in accordance with passwords transmitted via a telephone from the outside of home.

Japanese Unexamined Patent Application Publication No. 2002-41378 discloses a system in which a server is disposed between a controlling terminal and a controlled terminal, and the controlling terminal controls the controlled terminal via the server.

In those control systems, a device to be controlled is required to be always connected to a control device via a communication means so that the control device disposed at a remote location can access the device to be controlled (for example, in the system disclosed in Japanese Unexamined Patent Application Publication No. 2000-184081, a home electric appliance is always connected to a telephone line via a remote controller and an adaptor).

That is, when a first device serving as a controlling device and a second device serving as a controlled device can communicate with each other whenever communication is needed, either device can start communication under the initiative of that device. For example, the first device can transmit various data including a request to the second device, and, conversely, the second device can transmit various data to the first device, whenever transmission is required.

This makes it possible to control the device by communicating with the device via a network, whenever the control is needed.

However, in a case in which a device such as a IC card, a display, or a memory is remotely controlled in an environment in which the device is not always connected to a network, the device is generally controlled in such a manner that a client such as a personal computer, which manages the device, transmits a request to a server, and the client controls the operation of the device in accordance with a response returned from the server. In this technique, however, it is difficult for the server to directly control the device under the initiative of the server.

That is, because the device is not always connected to the network, the server cannot access the client with an arbitrary timing to control the device managed by the client.

More specifically, it is very difficult for the server to take the initiative in changing a property of a device such as a IC card or a non-contact RF ID receiving) or controlling the operation of the device that is connected indirectly to the server with a particular timing when the device is placed near to or directly on an apparatus (such as a IC card reader/writer or a RF ID receiver) connected to a network.

Furthermore, in the conventional control system, when commands or responses are transmitted between a server and a client, one command or one response is transmitted at a time. This results in an increase in the number of times that transmission is performed between the server and the client, and thus results in an increase in communication cost.

Because information such as a header and a footer is added each time a command or a response is transmitted, the data size transmitted at a time increases and the communication time needed for each transmission increases. The above-described problem is serious in particular when a terminal such as a portable telephone, communication with which is low in communication speed and needs high cost, is remotely controlled.

Furthermore, in the conventional control system, when a client receives a command transmitted from a server, if an error occurs at the client, the process is terminated regardless of the type of the error. To make the client perform a following process, it is required that the server and the client be connected to each other and a command be retransmitted.

SUMMARY OF THE INVENTION

In view of the above, it is an object of the present invention to provide a technique of remotely controlling a device via a network in a highly reliable and efficient manner.

The present invention provides a control system comprising an information processing apparatus and an information terminal connected with each other via a network, wherein the information terminal includes request means for, in a state in which a device is connected with the information terminal, requesting the information processing apparatus to establish communication via the network, receiving means for receiving a packet including a command for controlling the device, from the information processing apparatus via communication established in response to the request issued by the request means, and control means for controlling the device in accordance with the command included in the packet received by the receiving means, and the information processing apparatus includes establishment means for establishing communication performed via the network between the information processing apparatus and the information terminal, in response to the request issued by the information terminal, and transmission means for transmitting the packet to the information terminal from the information processing apparatus after the communication with the information terminal is established by the establishment means.

The present invention provides a method for a control system, comprising the steps of, in a state in which a device is connected with an information terminal, requesting an information processing apparatus to establish communication via a network, receiving a packet including a command for controlling the device, from the information processing apparatus via communication established in response to the request issued in the request step, controlling the device in accordance with the command included in the packet: received in the reception step, establishing communication performed via the network between the information processing apparatus and the information terminal, in response to the request issued by the information terminal, and transmitting a packet to the information terminal from the information processing apparatus after the communication with the information terminal is established in the establishment step.

The present invention also provides an information processing apparatus comprising establishment means for establishing communication performed via a network between the information processing apparatus and an information terminal, in response to a request issued, in a state in which a device is connected with the information terminal, by the information terminal, and transmission means for transmitting a first packet including a command for controlling the device to the information terminal from the information processing apparatus after the communication with the information terminal is established by the establishment means.

The information processing apparatus may further comprise receiving means for receiving, from the information terminal, a second packet including a response to the command transmitted from the transmission means.

The command may include information indicating whether, when the information terminal fails to perform a process in accordance with the command, a process should be continued in accordance with a following command.

The first packet transmitted by the transmission means may include a plurality of commands belonging to the same protocol.

The transmission means may transmit, together with the first packet, a simple program for causing the information terminal to determine which process should be performed by the device.

The first packet transmitted by the transmission means may include identification information identifying the device to be controlled in accordance with the command.

When the communication link established by the establishment means includes a firewall of the information terminal, the transmission means may transmit the first packet using HTTP as a communication protocol.

The transmission means may maintain the communication link using HTTP established by the establishment means for a period during which a plurality of first packets are transmitted.

The information processing apparatus may further comprise command means for commanding the information terminal to start transmitting predetermined information in the communication established by the establishment means.

The present invention also provides an information processing method associated with an information processing apparatus, comprising the steps of establishing communication performed via a network between the information processing apparatus and an information terminal, in response to a request issued, in a state in which a device is connected with the information terminal, by the information terminal, and transmitting a packet including a command for controlling the device to the information terminal from the information processing apparatus after the communication with the information terminal is established in the establishment step.

The present invention also provides a first program and a storage medium including the first program stored thereon, wherein the program comprises the steps of establishing communication performed via a network between an information processing apparatus and an information terminal, in response to a request issued, in a state in which a device is connected with the information terminal, by the information terminal, and transmitting a packet including a command for controlling the device to the information terminal from the information processing apparatus after the communication between the information terminal and the information processing apparatus is established in the establishment step.

The present invention also provides an information terminal comprising request means for, in a state in which a device is connected with the information terminal, requesting an information processing apparatus to establish communication via a network, receiving means for receiving a first packet including a command for controlling the device, from the information processing apparatus via communication established in response to the request issued by the request means, and control means for controlling the device in accordance with the command included in the first packet received by the receiving means.

The information terminal may further comprise transmission means for transmitting to the information processing apparatus a second packet including a response indicating a result of controlling performed by the control means on the device.

The present invention also provides an information processing method comprising the steps of in a state in which a device is connected with an information terminal, requesting the information processing apparatus to establish communication via a network, receiving a packet including a command for controlling the device, from the information processing apparatus via communication established in response to the request issued in the request step, and controlling the device in accordance with the command included in the packet received in the reception step.

The present invention also provides a second program and a storage medium including the second program stored thereon, wherein the second program includes the steps of in a state in which a device is connected with an information terminal, requesting an information processing apparatus to establish communication via a network, receiving a packet including a command for controlling the device, from the information processing apparatus via communication established in response to the request issued in the request step, ad controlling the device in accordance with the command included in the packet received in the reception step.

In the control system and the method according to the present invention, in a state in which a device is connected with an information terminal, a request for establishing communication via a network is issued to an information processing apparatus, a packet including a command for controlling the device is transmitted from the information processing apparatus in communication established in response to the request and received by the information terminal, and the device is controlled in accordance with the command included in the received packet. After communication via the network between the information processing apparatus and the information terminal is established in response to the request issued by the information terminal, a packet is transmitted to the information terminal.

In the information processing apparatus, the information processing method, the storage medium, and the program according to the present invention, communication via a network between the information processing apparatus and an information terminal is established in response to a request issued by the information terminal in a state in which a device is connected to the information terminal. After the communication between the information processing apparatus and the information terminal is established, a first packet including a command for controlling the device is transmitted to the information terminal.

In the information processing terminal, the method for the information processing terminal, the storage medium, and the program according to the present invention, in a state in which a device is connected with an information terminal, a request for establishing communication via a network is issued to an information processing apparatus. After the communication is established in response to the request, a packet including a command for controlling the device is received from the information processing apparatus via communication established, and the device is controlled in accordance with the command included in the received packet.

BRIEF DESCRIPTION OF THE DRAWINGS

FIG. 7 is a diagram showing messages used in a handshake protocol;

FIG. 8 is a diagram showing a handshake protocol executed using messages shown in FIG. 7;

FIG. 9 is a diagram showing messages used in a farewell protocol;

FIG. 11 is a diagram showing messages used in an error protocol;

FIG. 14 is a diagram showing messages used in an update entity protocol;

FIG. 18 is a diagram showing messages used in an operate entity protocol;

DESCRIPTION OF THE PREFERRED EMBODIMENTS

Figure 1:
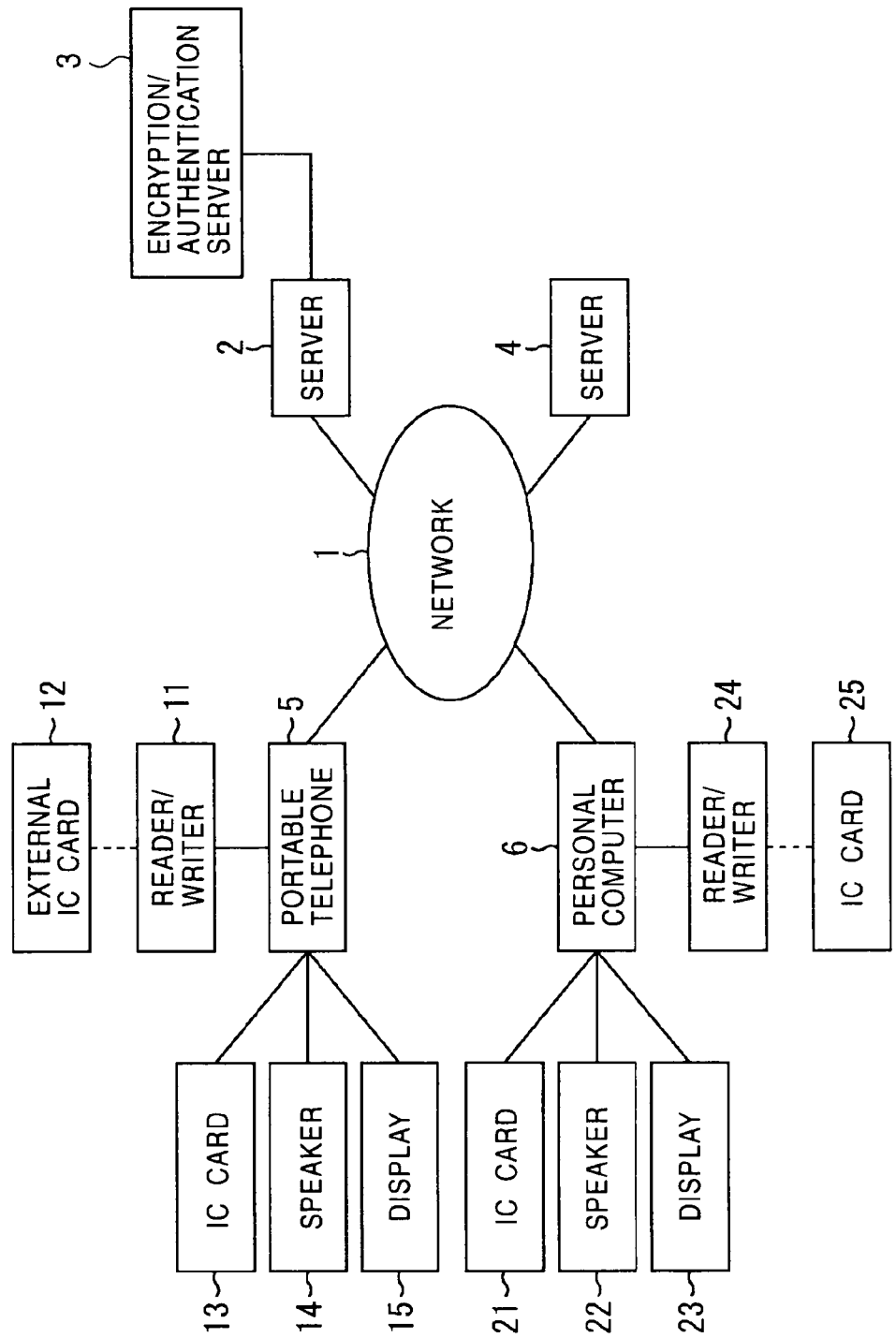
FIG. 1 is a diagram showing an example of a control system according to the present invention.

FIG. 1 shows an example of a control system according to the present invention.

Clients are connected to a network 1 (devices are connected to the network 1 via clients), and servers 2 and 4 for remotely controlling the clients are also connected to the network 1. The server 2 is also connected to a cryptography/authentication server 3 for performing encryption, decryption, and authentication of data in cooperation with the server 2.

Each of the server 2 and the server 4 controls devices via a client.

A portable telephone 5 and a personal computer 6 serving as clients are connected to the network 1. As will be described in detail later, a protocol is used which allows a server (the server 2 or the server 4) to control a client (the portable telephone 5 or the personal computer 6) under the initiative of the server via communication between the server and the client.

In the example shown in FIG. 1, a reader/writer 11, a IC card 13, a speaker 14, and a display 15, which are devices controlled by the server 2 or the server 4 via the client, are connected to the portable telephone 5 or disposed in the portable telephone 5.

An external IC card 12 is indirectly connected to the portable telephone 5 via a reader/writer 11. Unlike the IC card 13 that is directly connected to or disposed in the portable telephone 5, the external IC card 12 is indirectly connected to the portable telephone 5 via communication using electromagnetic induction when the external IC card 12 is placed near to or directly on the reader/writer 11.

Similarly, in FIG. 1, a IC card 21, a speaker 22, a display 23, and a reader/writer 24, which are devices controlled by the server 2 or the server 4 via the client, are connected to the personal computer 6. An external IC card 25 is placed near to or directly on the reader/writer 24 with an arbitrary timing.

Those devices (the reader/writer 11, the external IC card 12, the IC card 13, the speaker 14, the display 15, the IC card 21, the speaker 22, the display 23, the reader/writer 24, and the external IC card 25) are not always connected to the network 1 via clients but are connected with an arbitrary timing as required.

As a matter of course, the system configuration shown in FIG. 1 can be modified as required. For example, in addition to or instead of the portable telephone 5 or the personal computer 6, a PDA (Personal Digital Assistant) device as a client or a memory as a device may be connected to the server 2 or the server 4 via the network 1.

Figure 2:
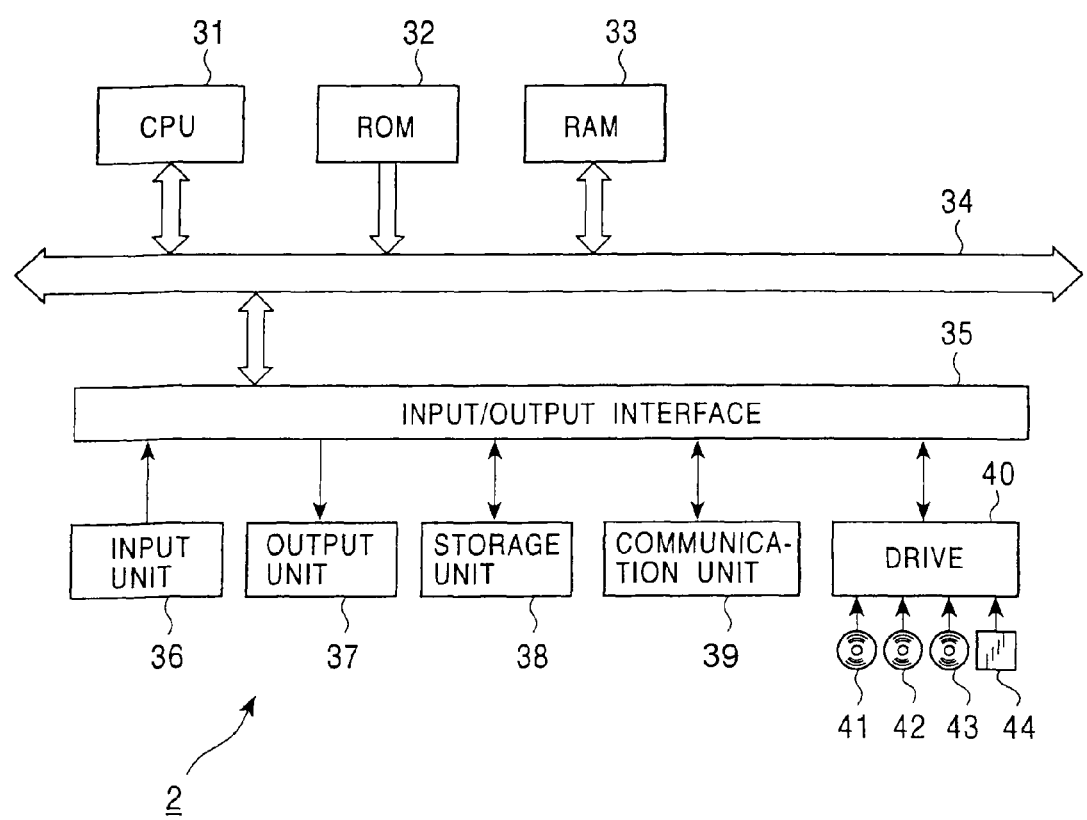
FIG. 2 is a block diagram showing an example of a configuration of a server shown in FIG. 1.

FIG. 2 is a block diagram showing an example of a configuration of the server 2 shown in FIG. 1.

A CPU (Central Processing Unit) 31 performs various processes in accordance with a program stored in a ROM (Read Only Memory) 32 or a program loaded into a RAM (Random Access Memory) 33 from a storage unit 38. The RAM 33 is also used to store data necessary in processes executed by the CPU 31.

For example, a server for controlling clients via communication using a protocol (hereinafter, referred to as a control protocol) in the communication system shown in FIG. 1 is realized by executing a particular control program on the CPU 31.

The CPU 31, the ROM 32, and the RAM 33 are connected to each other via a bus 34. The bus 34 is also connected to an input/output interface 35.

The input/output interface 35 is also connected to an input unit 36 including a keyboard, mouse, and the like, an output unit 37 including a display such as a CRT (Cathode Ray Tube) or a LCD (Liquid Crystal Display) and a speaker, a storage unit 38 such as a hard disk drive, and a communication unit 39 such as a modem or a terminal adapter. The communication unit 39 is responsible or communication via the network 1.

A drive 40 is also connected to the input/output interface 35 as required, and a magnetic disk 41, an optical disk 42, a magnetooptical disk 43, or a semiconductor memory 44 is mounted on the drive 40, as required, to install a computer program therefrom into the storage unit 38.

The server 4 and the portable telephone 5 and the personal computer 6 serving as clients have similar configurations to that of the server 2 described above with reference to FIG. 2, and thus a duplicated description of the configurations of those server and clients is not given herein. In the following description, FIG. 2 is also referred to when the portable telephone 5 or the personal computer 6 is discussed.

The protocol used in communication between a server and a client is described below. Hereinafter, the protocol used in communication between a server and a client is referred to as a control protocol.

In the background of a Web application executed on a client, communication between the client and a server is performed using the control protocol. In the portable telephone 5 or a similar apparatus serving as a client, the Web application is not necessary, only communication between the client and the server is performed. In this case, for example, an application of the portable telephone 5 retains all data to be displayed, and the data is displayed by controlling the application and the display in a similar manner to that in which the device is controlled.

A Web application using control protocols may be developed. In such a Web application, for example, a business logic may be described in a single function/method. This provides the following advantages. Firstly, the application can be executed without concern for disconnection of HTTP (Hyper Text Transfer Protocol). Secondly, a server is allowed to transmit a request to a client (that is, a requester of HTTP is not limited to a client). Thirdly, an arbitrary process is allowed to be preformed on a client (there is no limitation similar to that in Applet or ActiveX control).

The control protocol includes a data transfer protocol and other subprotocols. For example, subprotocols include a handshake protocol, a farewell protocol, an error protocol, an update entity protocol, an application data transfer protocol, and an operate entity protocol.

More particularly, the data transfer protocol defines a transmission/reception procedure of a subprotocol message, and the handshake protocol defines a procedure of establishing a connection. The farewell protocol defines a procedure of releasing a connection, and the error protocol defines an error notification procedure.

The update entity protocol defines a procedure performed by a server to change the state of a client. The application data transfer protocol defines a transmission/reception procedure of data specific to an application. The operate entity protocol defines a procedure performed by a server to operate a client.

The control protocol including those protocols described above defines only a core (frame) of data communication. To perform a process specific to an application, such as an operation of a particular device, an extension (extension module) for the application is needed. That is, a combination of a main control protocol and an extension defines an operation procedure.

Figure 3:
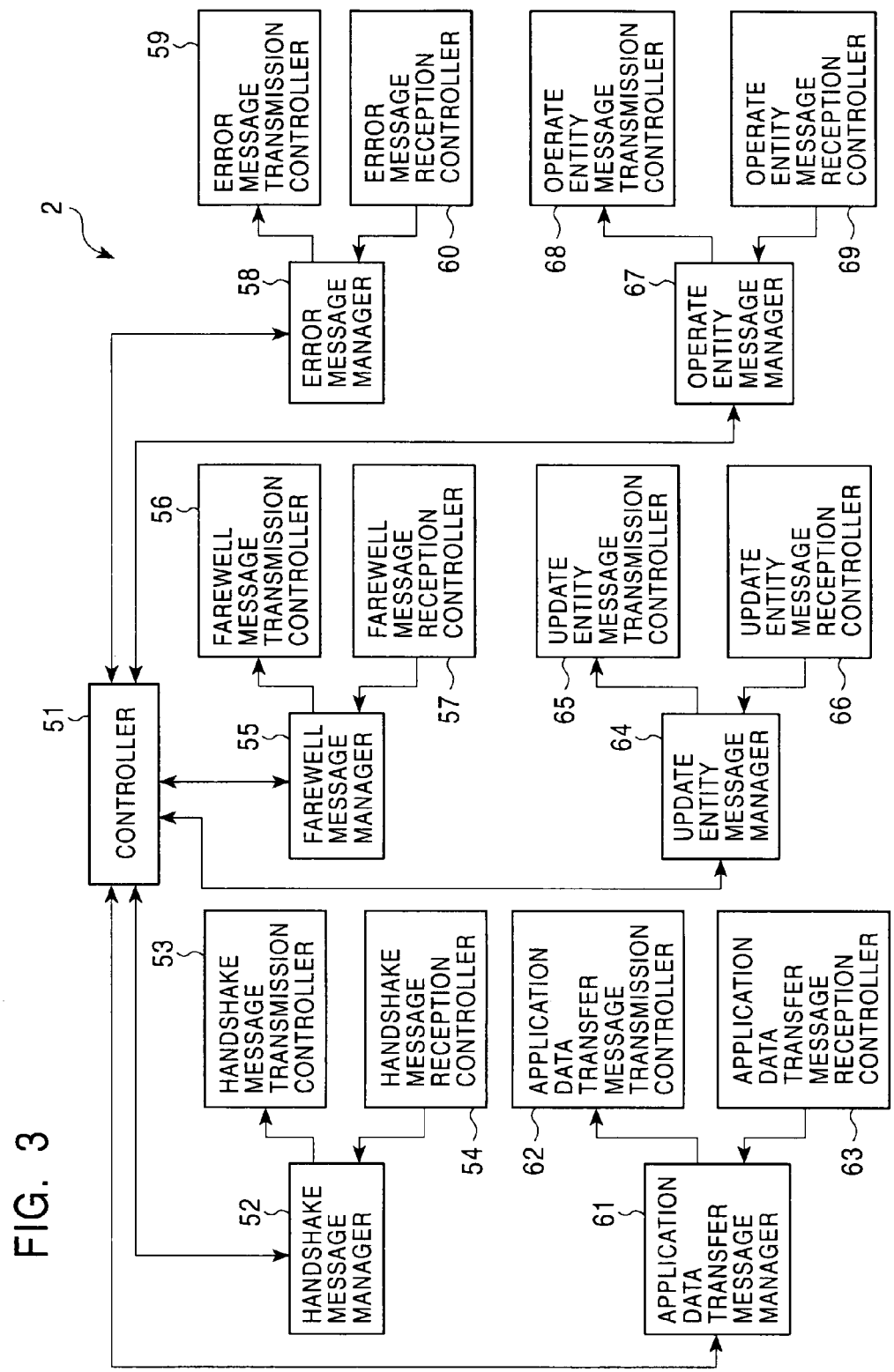
FIG. 3 is a block diagram showing an example of a functional configuration of the server.

FIG. 3 is a block diagram showing an example of a functional configuration of a server (for example, the server 2) performing communication according to a control protocol. Each functional block shown in FIG. 3 is realized by executing a particular control program on a CPU 31 of the server 2.

A controller 51 controls the entire server 2 including a handshake message manager 52 for managing messages included in a handshake protocol, a farewell message manager 55 for managing messages included in a farewell protocol, an error message manager 58 for managing messages included in an error protocol, an application-data-transfer message manager 61 for managing messages included in an application data transfer protocol, an update-entity message manager 64 for managing messages included in an update entity protocol, and an operate-entity message manager 67 for managing messages included in an operate entity protocol.

The messages included in the handshake protocol (hereinafter referred to as handshake messages) will be described in detail later with reference to FIG. 7. The messages included in the farewell protocol (hereinafter referred to as farewell messages) will be described in detail later with reference to FIG. 9. The messages included in the error protocol (hereinafter referred to as error messages) will be described in detail later with reference to FIG. 11. The messages included in the update entity protocol (hereinafter referred to as update entity messages) will be described in detail later with reference to FIG. 14. The messages included in the application data transfer protocol (hereinafter referred to as application data transfer messages) will be described in detail later with reference to FIG. 16. The messages included in the operate entity protocol (hereinafter referred to as operate-entity messages) will be described in detail later with reference to FIG. 18.

The handshake message manager 52 manages processes associated with handshake messages. For example, if a handshake message included in a packet transmitted from a client is received by a handshake message reception controller 54 and transferred to the handshake message manager 52, the handshake message manager 52 produces a handshake message corresponding to the received message and supplies the produced handshake message, to be transmitted to the client, to a handshake message transmission controller 53.

The handshake message transmission controller 53 controls transmission, performed by the communication unit 39 shown in FIG. 2, of handshake messages to clients such as the portable telephone 5. The handshake message reception controller 54 controls reception, performed by the communication unit 39 shown in FIG. 2, of handshake messages from clients.

The farewell message manager 55 controls processes associated with farewell messages. For example, if a farewell message included in a packet transmitted from a client is received by a farewell message reception controller 57 and transferred to the farewell message manager 55, the farewell message manager 55 produces a farewell message in response to the received message, and supplies the produced farewell message, to be transmitted to the client, to a farewell message transmission controller 56.

The farewell message transmission controller 56 controls transmission, performed by the communication unit 39 shown in FIG. 2, of farewell messages to clients. The farewell message reception controller 57 controls reception, performed by the communication unit 39 shown in FIG. 2, of farewell messages from clients.

The error message manager 58 controls processes associated with error messages. For example, if the controller 51 detects that a format error is included in a packet received from a client, the error message manager 58 produces an error message depending on the detected error and supplies the produced error message, to be transmitted to the client, to an error message transmission controller 59.

The error message transmission controller 59 controls transmission, performed by the communication unit 39 shown in FIG. 2, of error messages to clients. An error message reception controller 60 controls reception, performed by the communication unit 39 shown in FIG. 2, of error messages from clients.

The application-data-transfer message manager 61 manages application-data-transfer messages. For example, if an application-data-transfer message included in a packet transmitted from a client is received by an application-data-transfer message reception controller 63 and transferred to the application-data-transfer message manager 61, the application-data-transfer message manager 61 produces an application-data-transfer message in response to the received message and supplied the produced application-data-transfer message, to be transmitted to the client, to an application-data-transfer message transmission controller 62.

The application-data-transfer message transmission controller 62 controls transmission, performed by the communication unit 39 shown in FIG. 2, of application-data-transfer messages to clients. More particularly, the application-data-transfer message transmission controller 62 adds a finished message to a set of a particular number of messages supplied from the application-data-transfer message manager 61 and transmits them in the form of a packet to a client.

The application-data-transfer message reception controller 63 controls reception, performed by the communication unit 39 shown in FIG. 2, of application-data-transfer messages from clients. More particularly, the application-data-transfer message reception controller 63 detects the end of a packet received from a client by detecting a finished message included in the packet, the application-data-transfer message reception controller 63 outputs an application-data-transfer message included in the packet to the application-data-transfer message manager 61.

The update-entity message manager 64 manages processes associated with update-entity messages. For example, if the update-entity message manager 64 is commanded by the controller 51 to transmit a particular update-entity message to a client, the update-entity message manager 64 produces an update entity message according to the command and supplies the produced update entity message, to be transmitted to the client, to an update-entity message transmission controller 65.

The update-entity message transmission controller 65 controls transmission, performed by the communication unit 39 shown in FIG. 2, of update entity messages to clients. More particularly, the update-entity message transmission controller 65 adds a finished message to a set of a particular number of messages supplied from the update-entity message manager 64 and transmits them in the form of a packet to a client.

An update entity message reception controller 66 controls reception, performed by the communication unit 39 shown in FIG. 2, of update entity message from clients. More particularly, the update entity message reception controller 66 detects the end of a packet received from a client by detecting a finished message included in the packet, and the update entity message reception controller 66 outputs an update entity message included in the packet to the update-entity message manager 64.

The operate-entity message manager 67 manages processes associated with operate-entity messages. For example, if the operate-entity message manager 67 is commanded by the controller 51 to transmit a particular operate-entity message to a client, the operate-entity message manager 67 produces an operate-entity message according to the command and supplies the produced operate-entity message, to be transmitted to the client, to an operate-entity message transmission controller 68.

The operate-entity message transmission controller 68 controls transmission, performed by the communication unit 39 shown in FIG. 2, of operate-entity messages to clients. More particularly, the operate-entity message transmission controller 68 adds a finished message to a set of a particular number of messages supplied from the operate-entity message manager 67 and transmits them in the form of a packet to a client.

An operate-entity message reception controller 69 controls reception, performed by the communication unit 39 shown in FIG. 2, of operate-entity messages from clients. More particularly, the operate-entity message reception controller 69 detects the end of a packet received from a client by detecting a finished message included in the packet, and the operate-entity message reception controller 69 outputs an operate-entity message included in the packet to the operate-entity message manager 67.

Figure 4:
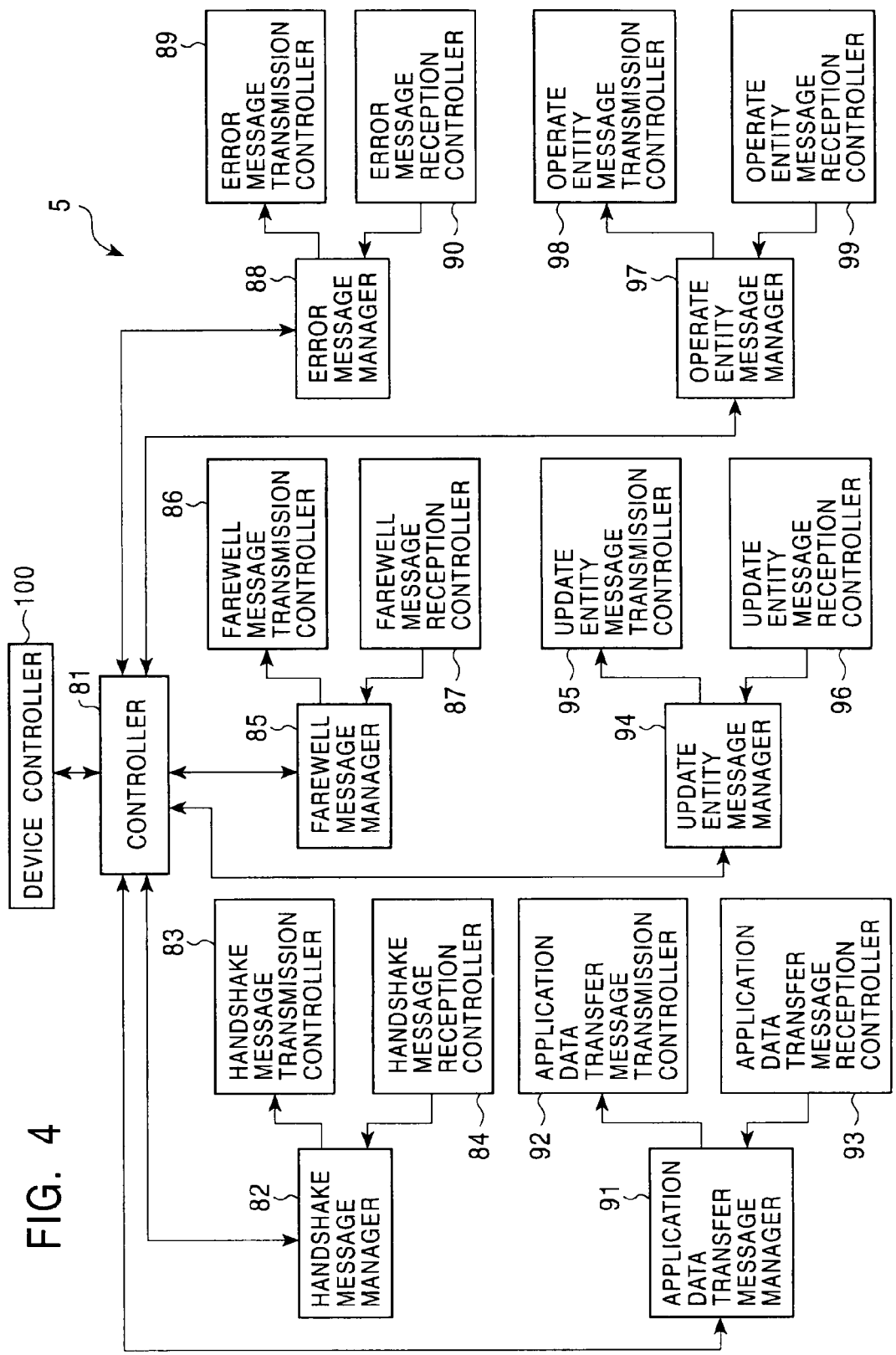
FIG. 4 is a block diagram showing an example of a functional configuration of a client.

FIG. 4 is a block diagram showing an example of a functional configuration of a client (for example, the portable telephone 5) performing communication according to a control protocol. The functional configuration shown in FIG. 4 is similar to the functional configuration of the server described above with reference to FIG. 3, and thus a duplicated description thereof is not given herein.

Each functional block shown in FIG. 4 is realized by executing a particular control program on a CPU 31 of the portable telephone 5.

A controller 81 controls the entire portable telephone (client) including a handshake message manager 82, a farewell message manager 85, an error message manager 88, an application-data-transfer message manager 91, an update-entity message manager 94 and an operate-entity message manager 97.

For example, when an update-entity message transmitted from a server is received by the update entity message reception controller 96 and transferred to the controller 81 via the update-entity message manager 94, the controller 81 commands a device controller 100 to control a device to perform a process according to the received update-entity message.

After completion of the process performed by the device connected to the client, the controller 81 acquires information indicating the result of the process (for example, information indicating whether the process is successfully completed) from the device controller 100 and supplies the acquired information to the update-entity message manager 94.

The update-entity message manager 94 produces a response message (update-entity message) on the basis of the results of the process and transmits the produced response message to the server via the update-entity message transmission controller 95.

The device controller 100 controls the operation of a device connected to the client in accordance with a command that may be issued in one of the following situations. Firstly, when an application-data-transfer message acquired by the application-data-transfer message reception controller 93 is transferred to the controller 81, a command for causing a device to perform a process according to the application-data-transfer message is issued by the controller 81. Secondary, when an update-entity message acquired by the update entity message reception controller 96 is transferred to the controller 81, a command for causing a device to perform a process according to the update-entity message is issued by the controller 81. Thirdly, when an operate-entity message acquired by the operate-entity message reception controller 99 is transferred to the controller 81, a command for causing a device to perform a process according to the operate-entity message is issued by the controller 81.

The device controller 100 supplies information indicating the result of the control (the result of the process performed by the device) to the controller 81. On the basis of the result of the process, a response to be sent to the server is produced by the application-data-transfer message manager 91, the update-entity message manager 94, or the operate-entity message manager 97.

Now, referring to FIG. 5, state transitions of control protocols are described below. The details of communication performed in respective state will be described later.

In step S1, the CPU 31 of a client (for example, the portable telephone 5) starts to execute a client program. As a result, state transitions start. When the client program is started, the following information is necessary.

Server URL (Uniform Resource Locator): URL of a server that controls the client.
URL of a viewer Web application: URL of a Web application that provides a viewer on a screen of an application executed at an end user.
This URL is not necessary when the client (for example, the portable telephone 5) does not need the Web application.
Cookie (optional): Cookie for identifying a session
A client transmits a HTTP request using a specified session ID to a server (for example, the server 2) specified by a server URL. In the example described above, a HTTP request for posting a message at a server is transmitted to a particular port number of the URL.

In a case in which cookie information is set when the client program is started, the client adds specified cookie information to a cookie header of the HTTP request.

A response message returned from a server is described in a content part of a HTTP response.

After starting the client program, in step S2, the client transmits a client-hello message using a handshake subprotocol to request establishment of communication.

That is, in a handshake state (state 1 in FIG. 5), a client-hello message is transmitted and a connection is established.

After completion of the handshake protocol, in step S3, the client transmits a finished message to the server. In response, the connection is established, and the initiative of the control is transferred to the server.

Figure 25:
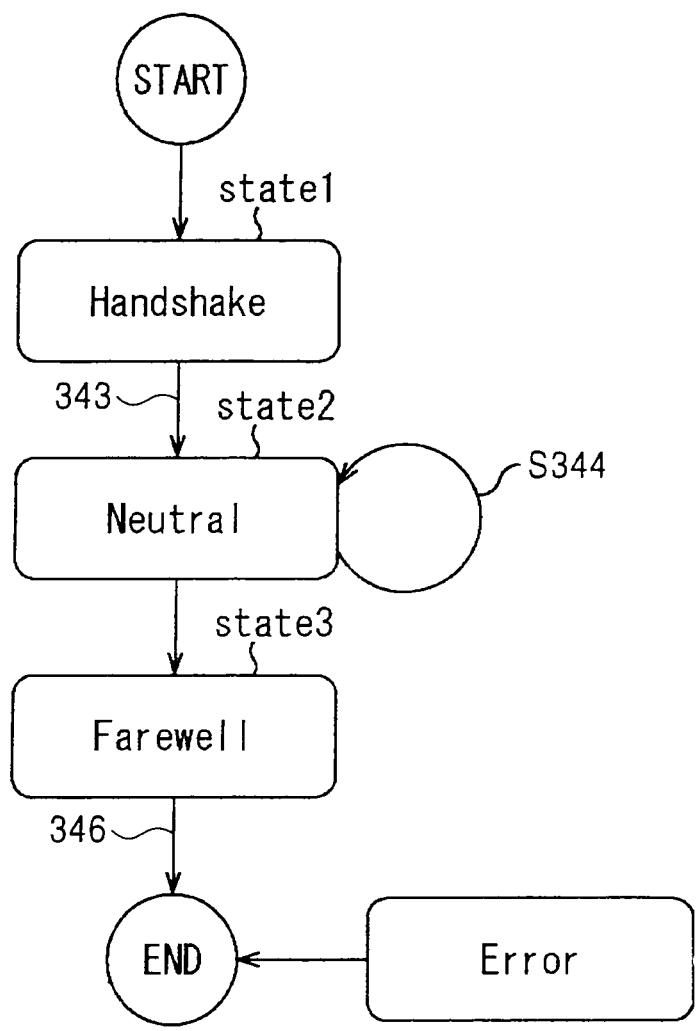
FIG. 25 is a state transition diagram of control protocols.

In some cases, connection is established in response to transmitting a client-hello-done message from a client to a server (FIG. 25).

That is, a particular command (message) is transmitted from the server to the client, and a response indicating the result of the process performed in accordance with the command is returned from the client to the server. After the connection is established and the initiative is transferred to the server, the state changes into a neutral state (state 2 in FIG. 5).

In step S4, in the neutral state, the server controls the state of the client or transmits/receives data specific to the application in accordance with the logic of the application.

In this process, the control of the state of the client is performed using an update-entity subprotocol. On the other hand, an application-data-transfer subprotocol is used to transmit/receive data specific to the application, and an operate-entity subprotocol is used to operate the device connected to the client.

Only in the neutral state, an arbitrary combination of the above three subprotocol protocols is allowed to be transmitted/received at a time in an arbitrary order. For example, as will be described late with reference to FIGS. 20 to 22, one packet can include only one type of subprotocol (that is, one packet includes a header and a message sequence of one type of subprotocol). At the end of the packet, a finished message of the subprotocol is placed.

In each message transmitted from the server to the client using a subprotocol (update entity subprotocol, application data transfer subprotocol, or operate entity subprotocol) in the neutral state, there is included information indicating whether, if the process is failed, the following process should be continued.

For example, when the client fails to process a message whose starting bit is "0", following messages are not processed. On the other hand, when the client fails to process a message whose starting bit is "1", following messages are processed. This also applies to other subprotocol extension messages.

If the logic of the application is completed, then, in step S5, the server transmits a server-good-bye message to the client using a farewell subprotocol. The state after the transmission of the server-good-bye message and before the releasing of connection is referred to as a farewell state (state 3 in FIG. 5).

If the server determines that the farewell protocol is completed, then, in step S6, the server transmits a finished message to the client and ends the connection. In response, in step S7, the client releases the resource and ends the process.

In some cases, the connection is ended when the server transmits a server-good-bye-done message to the client not via the farewell state. In response, the client releases the resource and ends the process (FIG. 25).

When an error occurs at an arbitrary step (state) and it becomes impossible to continue the following process, the client of the server jumps to step S8 and transmits an error message using an error subprotocol to the server or the client. The state from the occurrence of an error to the end of communication using a control protocol is referred to as an error state (state 4 in FIG. 5).

In step S9, for example, when a finished message is transmitted from the message to the client, the error state is ended, and the connection is closed.

As described above, communication between a client and a server is performed using a control protocol whose state changes in the above-described manner.

Now, the data format of packets defined by the data transfer protocol is described below.

Figure 6:
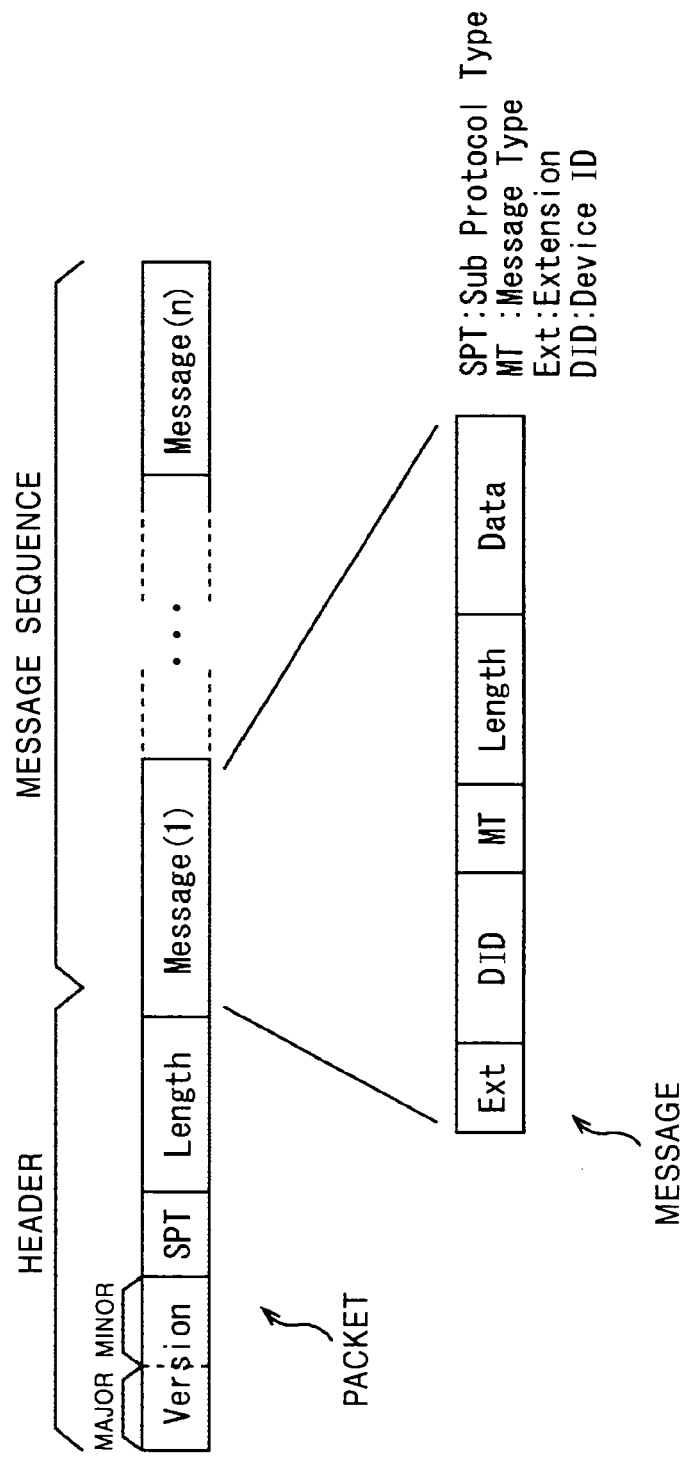
FIG. 6 is a diagram showing an example of a data format of a packet.

FIG. 6 shows an example of a data format of a packet.

As shown in FIG. 6, a packet includes a header and a sequence of a predetermined number of messages (subprotocol messages).

The header includes three fields: a version field, a subprotocol type (SPT) field, and a length field.

The version number of the control protocol is described in the version field. More specifically, a major version number is represented by high-order bytes of the version and a minor version number is represented by low-order bytes. If the data transfer protocol is changed, the major version number is increased, and the minor version number is increased when a subprotocol is added or changed.

The subprotocol type indicates the type of a subprotocol used in a packet, wherein the type may be one of handshake protocol, farewell protocol, error protocol, application data transfer protocol, update-entity protocol, and operate entity protocol.

The length indicates the length of the message sequence.

Each message included in the message sequence consists of an extension (Ext) field, a device ID (DID) field, a message type (MT) field, a length field, and a data field.

In the extension field, the type of an extension for a process specific to the application domain is described.

In the device ID field, the ID of a device to be controlled according to the message is described. For example, in a case in which a plurality of devices are connected to a client, the ID may be set so as to generically indicate all those devices to be controlled according to the message, or the ID may be set such that the server and the client can deal with the message without concern for a specific device.

In the message type field, the type of the message is described. As will be described later, the handshake protocol may include a client-hello message transmitted from a client to a server or a server-hello message transmitted from a server to a client, and the type of such a message is indicated by the message type.

In the length field, the length of data in the data part of the message is described. The data format of the data part of the message depends on the message type.

The subprotocols are described in further detail below.

FIG. 7 shows messages transmitted using a handshake protocol.

As shown in FIG. 7, a finished message indicates the end of a subprotocol, and a warning message indicates a warning. The data part of the warning message includes a warning represented by a particular character string.

A client-hello message indicates the start of transmission of handshake data from a client to a server, and a client-hello-done message indicates the end of the handshake data.

A server-hello message indicates the start of handshake data from a server to a client, and a server-hello-done message indicates the end of the handshake data.

A devices message is a notification of a device list. In the data part of the devices message, device IDs uniquely assigned to respective devices, permission, type name lengths, type names, device name lengths, and device names are described. The permission indicates whether or not access to a device is permitted. When the permission is set to "0", access to the device (operation of the device) is permitted. However, access (operation) is not permitted when the permission is set to "1".

The devices message is used, for example, to inform a server of what devices are connected to the client and can be remotely operated and what processes devices can perform in response to given commands.

Referring to a sequence flow shown in FIG. 8, the handshake protocol, in which messages shown in FIG. 7 are transmitted, is described below. In this sequence, by way of example, processes are performed by the portable telephone 5 acting as a client and the server 2 acting as a server for controlling a device via communication using control protocols.

In step S21, the sequence of the handshake protocol starts when, for example, the handshake message transmission controller 83 (FIG. 4) of the portable telephone 5 (client) transmits a client-hello message to, for example, the server 2. More specifically, in response to a command issued by the controller 81, the handshake message manager 82 produces a client-hello message and transmits it to the server 2 via the handshake message transmission controller 83.

In step S22, the handshake message transmission controller 83 of the portable telephone 5 transmits a devices message to the server 2 to provide information associated with all devices that are connected to the portable telephone 5 and that can be controlled by the server 2. Also this devices message is produced by the handshake message manager 82 under the control of the controller 81.

For example, information about the reader/writer 11 connected to the portable telephone 5 and the external IC card 12 connected via the reader/writer 11 to the portable telephone 5 is provided to the server 2 using the devices message.

In step S23, a message specific to the application is transmitted. Thereafter, when a client-hello-done message is transmitted in step S24, the transmission of the handshake data from the portable telephone 5 to the server 2 is completed.

If the handshake message reception controller 54 of the server 2 acquires, in steps S41 to S44, the client-hello message, the devices message, the message specific to the application, and the client-hello-done message, transmitted from the portable telephone 5, then, in step S45, the handshake message transmission controller 53 (FIG. 3) transmits a server-hello message to the portable telephone 5.

In the next step S46, the handshake message transmission controller 53 of the server 2 transmits a message specific to the application. Thereafter, in step S47, the handshake message transmission controller 53 transmits a server-hello-done message. In the above steps, all messages including the message specific to the application are transmitted in the handshake protocol under the control of the handshake message transmission controller 53.

The server-hello message, the application-specific message, and server-hello-done message, transmitted from the sever 2, are received by the handshake message reception controller 84 of the portable telephone 5, in respective steps S25 to S27.

If both the portable telephone 5 and the server 2 have transmitted hello-done messages (the client-hello-done message and the server-hello-done message), then, in step S48, the handshake message transmission controller 53 of the server 2 transmits a finished message to the portable telephone 5.

The finished message transmitted from the server 2 is received, in step S28, by the handshake message reception controller 84 of the portable telephone 5.

In step S29, the handshake message transmission controller 83 of the portable telephone 5 transmits a message specific to the application. In the next step S30, the handshake message transmission controller 83 of the portable telephone 5 transmits a finished message to the server 2. The message specific to the application and the finished message transmitted from the portable telephone 5 are received in steps S49 and S50, respectively, by the handshake message reception controller 54 of the server 2. At this point of time, the handshake protocol is completed at both the portable telephone 5 and the server 2.

In FIG. 8, dotted lines indicate that messages specific to the application are transmitted only when they are necessary. Note that as many messages specific to the application as necessary are transmitted. For example, in step S23, no message is transmitted in some cases, but a plurality of messages are transmitted in some cases. This is also true in a sequence described later with reference to FIG. 10.

Although in FIG. 8, the handshake protocol is completed when the finished message is received in step S50 by the server 2, the handshake protocol may be completed when the client-hello-done message is received in step S44 by the server 2.

Furthermore, although in FIG. 8, the hello messages and the hello-done messages are transmitted by both the server 2 and the portable telephone 5, those messages may be transmitted only from the portable telephone 5 to the server 2. This makes it possible to quickly end the handshake protocol and start a process in the neutral state, although a slight reduction occurs in the reliability of the handshake protocol. In other words, if both the portable telephone 5 and the server 2 transmit/receive the hello messages and the hello-DONE messages, the handshake protocol is executed in a more reliable fashion.

FIG. 9 shows messages used in a farewell protocol.

A finished message indicates the end of a subprotocol, and a warning message indicates a warning. The data part of the warning message includes a warning message represented by a particular character string.

A client-good-bye message indicates the start of transmission of farewell data from a client to a server, and a client-good-bye-done message indicates the end of the farewell data.

A server-good-bye message indicates the start of farewell data from a server to a client, and a server-good-bye-done message indicates the end of the farewell data.

A return-code message is a notification of the end of code from the server, wherein its data part includes an end code.

Referring to a sequence flow shown in FIG. 10, the farewell protocol, in which messages shown in FIG. 9 are transmitted, is described below.

The farewell protocol starts when the farewell message transmission controller 56 of the server 2 transmits a server-good-bye message in step S81. That is, the farewell protocol starts when the server 2 having the initiative in communication transmits a message (the server 2 has the initiative in communication after the handshake protocol is completed, as described earlier with reference to FIG. 5).

In step S82, the farewell message transmission controller 56 of the server 2 transmits a return-code message to the portable telephone 5 (client). In the next step S83, a message specific to the application (a farewell extension message specified in the extension field) is transmitted.

After completion of transmitting all messages specific to the applications, the process proceeds to step S84. In step S84, the farewell message transmission controller 56 of the server 2 transmits a server-good-bye-done message to the portable telephone 5.

Each information transmitted from the server 2 in steps S81 and S84 is received in steps S61 to S64 by the farewell message reception controller 87 of the portable telephone 5.

In step S65, the farewell message transmission controller 86 of the portable telephone 5 transmits a client-good-bye message to the server 2.

In the next step S66, the farewell message transmission controller 86 of the portable telephone 5 transmits a message specific to the application. Thereafter, in step S67, the farewell message transmission controller 86 of the portable telephone 5 transmits a client-good-bye-done message.

After completion of transmitting the client-good-bye-done message, the farewell message transmission controller 86 of the portable telephone 5, the farewell message transmission controller 86 transmits a finished message in step S68. Each information transmitted in steps S65 to S68 from the farewell message transmission controller 86 of the portable telephone 5 is received in steps S85 to S88 by the farewell message reception controller 57 of the server 2.

If the finished message transmitted by the portable telephone 5 is received in step S88 by the farewell message reception controller 57 of the server 2, the process proceeds to step S89. In step S89, the farewell message transmission controller 56 transmits a finished message to the portable telephone 5 and ends the farewell protocol. The finished message transmitted from the farewell message transmission controller 56 of the server 2 is received in step S69 by the portable telephone 5.

Alternatively, the farewell protocol may be ended when the server-good-bye-done message is transmitted in step S84. This makes it possible to quickly end the farewell protocol.

FIG. 11 shows messages used in an error protocol.

A finished message indicates the end of a subprotocol, and a warning message indicates a warning. The data part of the warning message includes a warning message represented by a particular character string.

A packet-format-error message indicates that a packet includes a format error. An illegal-state-error message indicates that an illegal message has been detected.

An unexpected-error message indicates that an unexpected error has occurred.

The data part of each of the packet-format-error message, the illegal-state-error message, and the unexpected-error message includes an error message indicating the content of the error represented by a particular character string.

Figure 12:
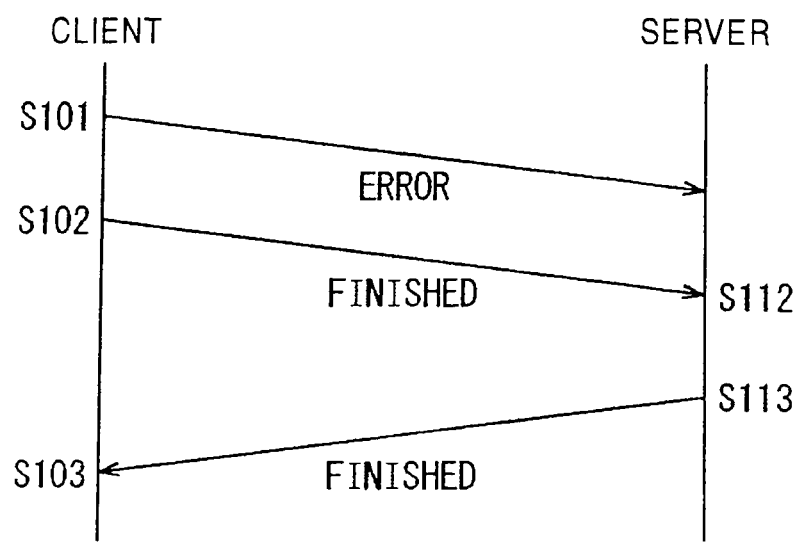
FIG. 12 is a diagram showing an error protocol executed using messages shown in FIG. 11.
Figure 13:
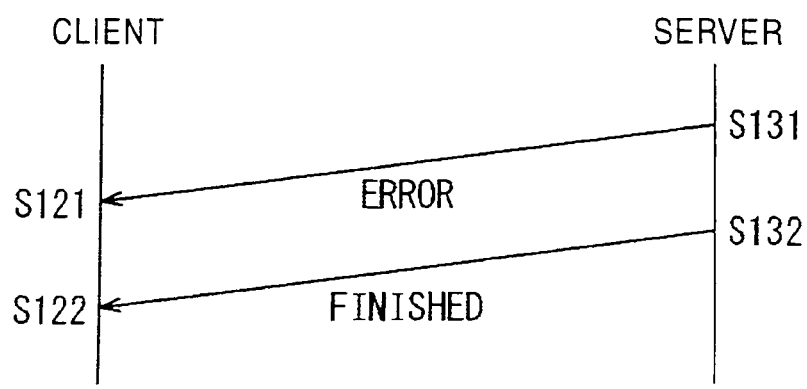
FIG. 13 is a diagram showing another example of an error protocol executed using messages shown in FIG. 11.

Referring to FIG. 12 and a sequence flow shown in FIG. 13, the error protocol, in which messages shown in FIG. 11 are transmitted, is described.

FIG. 12 shows a sequence of the error protocol executed when the portable telephone 5 detects an error.

If the controller 81 of the portable telephone 5 detects an error that makes it impossible to further continue the process, the controller 81 commands, in step S101, the error message manager 88 to transmit one of messages shown in FIG. 11 (a packet-format-error message, an illegal-state-error message, or an unexpected-error message) to inform the server 2 of the occurrence of the error (and the content of the detected error). More specifically, under the control of the controller 81, the error message manager 88 produces a particular message and transmits it via the error message transmission controller 89.

Thereafter, a finished message is transmitted in step S102 from the portable telephone 5 and received in step S112 by the server 2, and a finished message is transmitted in step S113 from the server 113 and received in step S103 by the portable telephone 5, thereby the communication between the server and the client is ended, as described earlier with reference to FIG. 5.

FIG. 13 shows an error protocol executed when the server 2 detects an error.

If the controller 51 of the server 2 detects an error that makes it impossible to further continue the process, the controller 51 commands, in step S131, the error message manager 58 to transmit a message depending on the content of the detected error to the portable telephone 5 to inform the occurrence of the error. More specifically, under the control of the controller 51, the error message manager 58 produces a particular message and transmits it via the error message transmission controller 59.

In step S132, after transmitting the message indicating the occurrence of the error, the error message transmission controller 59 of the server 2 transmits a finished message to the portable telephone 5.

The messages transmitted from the server 2 are received in steps S121 and S122 by the portable telephone 5, and the communication is ended.

As described above, each of the server 2 and the portable telephone 5 can transmit, with an arbitrary timing, an error message to the other apparatus when an error is detected.

Instead of transmitting a message using the error subprotocol, an error message defined in the application may be transmitted to notify the occurrence of an error.

Of the error messages, a warning message does not influence the sequence. When either one of the server 2 and the portable telephone 5 receives a warning message, the content of the message may be written in a log or may be ignored.

FIG. 14 shows messages transmitted in the update entity protocol.

Those messages transmitted in the update entity protocol are used to change the state (property) of devices. For example, those messages are used to turn on a LED (Light Emitting Diode) disposed on the surface of the reader/writer 11 shown in FIG. 1 or turn on the power of a particular device.

A finished message indicates the end of a protocol, and a warning message indicates a warning. The data part of the warning message includes a warning message represented by a particular character string.

A set-property message is transmitted from a server to a client to set a property of a device connected to the client.

A property-set message is a message returned from the client as a response to the set-property message.

This set-property message is one of messages whose failure will make it impossible to further continue the process. Therefore, the first bit of the set-property message is set so as to indicate that the process should be terminated if a failure occurs.

The data part of the set-property message includes information associated with a property to be set to a device, such as a property name length, property name, property value length, and property value.

The data part of the property-set message returned from the client as a response to the set-property message transmitted from the server includes a flag indicating whether or not the process specified by the set-property message has been successfully performed by the client.

A get-property message is transmitted from a server to a client to acquire the property value of a device connected to the client. A get-property message is a message returned from the client as a response to the property message.

This get-property message is one of messages whose failure will make it impossible to further continue the process. Therefore, the first bit of the get-property message is set so as to indicate that the process should be terminated if a failure occurs.

The data part of the get-property message includes information indicating the property name length, the property name, and the like of a device whose property value is to be acquired.

A property message is a message returned from the client as a response to the get-property message transmitted from the server. The data part of the property message includes information indicating the property name length, the property name, and the like, requested by the server, of a device.

A set-network-timeout message indicates a network time out to be set at the client.

This set-network-timeout message is one of messages whose failure at the client will not cause the process to be terminated. Therefore, the first bit of the set-network-timeout message is set so as to indicate that the process should be continues if a failure occurs.

The data part of the set-network-timeout message includes a time out value to be set at the client.

Referring to a sequence flow shown in FIG. 15, the update entity protocol, in which messages shown in FIG. 14 are transmitted, is described below.

When the server 2 wants to change the state of a device connected to the portable telephone 5, the update-entity message manager 64 of the server 2 produces, in step S151, an update-entity message to be transmitted to the portable telephone 5, under the control of the controller 51. The produced update-entity message is supplied to the update-entity message transmission controller 65.

In step S152, the update-entity message transmission controller 65 of the server 2 adds a finished message at the end of the sequence of update-entity messages produced in step S151 and transmits a packet including the sequence of update-entity messages and the finished message to the portable telephone 5.

That is, the packet including a particular number of update-entity messages produced in step S151 and the finished message added in step S152 is transmitted to the portable telephone 5.

Because a plurality of messages combined together with in one packet can be transmitted at a time to the portable telephone 5 (in this case, one header and one footer are needed to be added each time a plurality of messages are transmitted) the data size can be reduced compared with the case in which only one message is put together with a header and a footer in one packet and messages are transmitted on a message-by-message basis. This also allows reductions in the communication time and communication cost. This is also true for all protocols.

The update-entity messages included in the packet and transmitted from the server 2 are received in step S141 by the update entity message reception controller 96 of the portable telephone 5, and the finished message added at the end of the sequence of the update-entity messages is received in step S142.

In the portable telephone 5, when the messages included in the packet transmitted from the server are acquired, the messages are processed in the same order as the order in which the messages are acquired. As required, a response indicating the result of the process is produced by the controller 81.

The update entity message reception controller 96 of the portable telephone 5 detects the end of the packet by detecting the finished message transmitted from the server 2. In step S143, the update-entity message manager 94 produces responses (update-entity messages) to the received update-entity messages.

For example, if an update-entity message received from the server 2 indicates that a property value of a device should be changed, the device controller 100 changes the property value in accordance with the update-entity message, and the controller 81 informs the update-entity message manager 94 whether or not the property value has been successfully changed. On the bases of the notification, the update-entity message manager 94 produces a response and supplies the produced response to the update-entity message transmission controller 65.

In step S144, the update-entity message transmission controller 95 of the portable telephone 5 adds a finished message to the produced response and transmits a packet including the response and the finished message to the server 2. Whether or not responses are returned and how many responses are returned depend on messages received from the server 2.

In step S153, the packet including the sequence of update-entity messages transmitted from the portable telephone 5 is acquired by the update entity message reception controller 66 of the server 2, and the finished message added at the end of the sequence of the update-entity messages is acquired in step S154.

Hereinafter, packets transmitted in the neutral state from the server 2 to the portable telephone 5 are referred to as control packets (specific examples of control packets are a packet including no or one or more update-entity messages and a finished message, a packet including no or one or more application-data-transfer messages and a finished message, and a packet including no or one or more operate-entity messages and a finished message).

Packets returned from the portable telephone 5 to the server 2 to inform of the result of a process performed in accordance with messages included in control packets are referred to as response packets (wherein each response packet includes no or one or more responses and a finished message).

As described above, a control packet including update-entity messages and a finished message is transmitted from the server 2 to the portable telephone 5 via communication performed under the initiative of the server 2, and a process is performed by the portable telephone 5 in accordance with the update-entity messages. In the portable telephone 5, furthermore, responses to the update-entity messages received from the server 2 are produced, and a response packets including the responses and a finished message is returned to the server 2.

More specifically, if a control packet including a set-property message shown in FIG. 14 is transmitted from the server 2 to the portable telephone 5, then, in the portable telephone 5, a property value of a device is set in accordance with the set-property message, and a response packet including a property-set message (response) is returned to the server 2.

The sequence of update-entity messages transmitted from the portable telephone 5 or the server 2 may include a particular number of application-specific messages (update-entity extension message specified in the extension field).

Figures 15, 16:
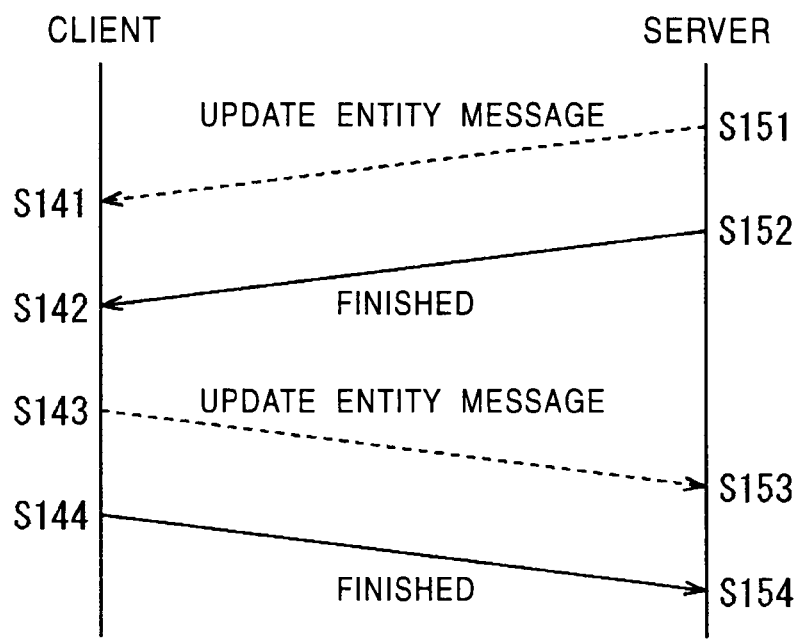
FIG. 15 is a diagram showing an update entity protocol executed using messages shown in FIG. 14.
FIG. 16 is a diagram showing messages used in an application data transfer protocol.

FIG. 16 shows messages used in the application data transfer protocol.

The application data transfer protocol is used, for example, when application data or an application command to control the external IC card 12 connected via the reader/writer 11 to the portable telephone 5 is transmitted between a server and a client (device).

A finished message indicates the end of a protocol, and a warning message indicates a warning. The data part of the warning message includes a warning message represented by a particular character string.

Figure 17:
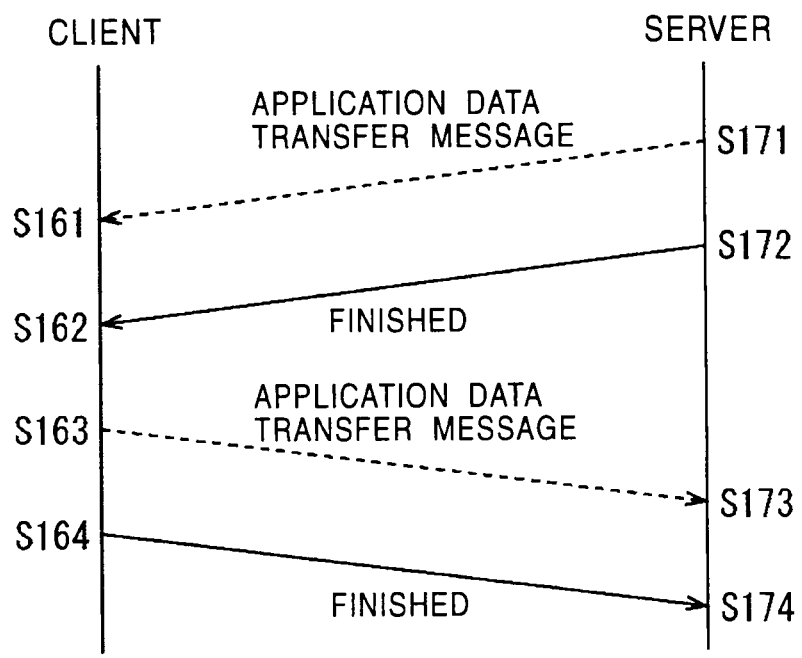
FIG. 17 is a diagram showing a sequence of an application data transfer protocol executed using messages shown in FIG. 16.

Referring to a sequence flow shown in FIG. 17, the application data transfer protocol, in which messages shown in FIG. 16 are transmitted, is described below.

In step S171, the application-data-transfer message manager 61 of the server 2 produces a set of application-data-transfer messages.

The produced application-data-transfer messages are supplied to the application-data-transfer message transmission controller 62.

In step S172, the application-data-transfer message transmission controller 62 of the server 2 adds a finished message at the end of the sequence of application-data-transfer messages produced, and transmits a control packet including the sequence of application-data-transfer messages and the finished message to the portable telephone 5.

The application-data-transfer messages included in the control packet are received in step S161 by the application-data-transfer message reception controller 93 of the portable telephone 5, and the finished message is received in step S162.

The application-data-transfer message reception controller 93 of the portable telephone 5 detects the end of the control packet received from the server 2 by detecting the finished message, and application-data-transfer message reception controller 93 of the portable telephone 5 supplies application-data-transfer messages included in the control packet to the application-data-transfer message manager 91.

In step S163, responses to application-data-transfer message included in the packet are produced. More specifically, information indicating the result of the process performed by the device controller 100 is provided to the application-data-transfer message manager 91, and the application-data-transfer message manager 91 produces responses depending on the result of the process. The produced responses are supplied to the application-data-transfer message transmission controller 92.

In step S164, the application-data-transfer message transmission controller 92 of the portable telephone 5 adds a finished message at the end of the sequence of the produced responses (application-data-transfer messages), and transmits a response packet including the sequence of the responses and the finished message to the server 2.

The application-data-transfer messages included in the packet transmitted from the portable telephone 5 are acquired in step S173 by the application-data-transfer message reception controller 63 of the server 2, and the finished message added at the end of the sequence of application-data-transfer messages is acquired in step S174.

Whether or not responses are returned and how many responses are returned depend on messages received from the server 2.

As in the case of the update entity protocol described above, the sequence of application-data-transfer messages transmitted from the portable telephone 5 or the server 2 may include a particular number of application-specific messages (application-data-transfer extension message specified in the extension field).

FIG. 18 shows messages used in the operate entity protocol.

The operate entity protocol is used to control a device connected to a client. For example, starting or stopping of radiation of a radio wave from the reader/writer 11 connected to the portable telephone 5, or displaying of a particular screen for use by a user to input a command/data is controlled using the operate entity protocol.

A finished message indicates the end of a protocol, and a warning message indicates a warning. The data part of the warning message includes a warning message represented by a particular character string.

An update-view message is transmitted from a server to a client to update a view (display screen) of the client. A response to the update-view message is returned as a view-updated message to the server.

This update-view message is one of messages whose failure will make it impossible to further continue the process. Therefore, the first bit of the update-view message is set so as to indicate that the process should be terminated if a failure occurs.

A view-updated message is a message returned as a response to the update-view message received from the server. The data part of the view-updated message includes a flag indicating whether or not the view has been successfully updated.

A begin-data-input message is transmitted from a server to a client to request the client to begin inputting data to a device. An end-data-input message is returned from the client as a response to the begin-data-input message.

This begin-data-input message is one of messages whose failure will make it impossible to further continue the process. Therefore, the first bit of the begin-data-input message is set so as to indicate that the process should be terminated if a failure occurs.

The data part of the end-data-input message returned from the client as the response to the begin-data-input message includes a flag indicating whether or not data has been successfully input and also includes information indicating property name length, the property name, the property value length, and the property value.

An operate-device message is transmitted from a server to a client to request the client to operate a device connected to the client.

A device-response message is returned from the client as a response to the operate-device message.

This operate-device message is one of messages whose failure will make it impossible to further continue the process. Therefore, the first bit of the operate-device message is set so as to indicate that the process should be terminated if a failure occurs.

The data part of the operate-device message includes information indicating the number of characters of the operation name, the operation name, the parameter length, and the parameter.

A device-response message is transmitted from a client to a server to inform the result of the operation performed on the device. The data part of the device-response message includes information indicating the response length and the response.

A play-sound message is transmitted from a server to a client to request the client to generate a sound corresponding to a logical name specified by the server. No response to the play-sound message is returned.

The play-sound message is one of messages whose failure at the client will not cause the process to be terminated. Therefore, the first bit of the play-sound message is set so as to indicate that the process should be continues if a failure occurs.

The data unit of the play-sound message includes information indicating the logical name of the sound to be generated.

Figure 19:
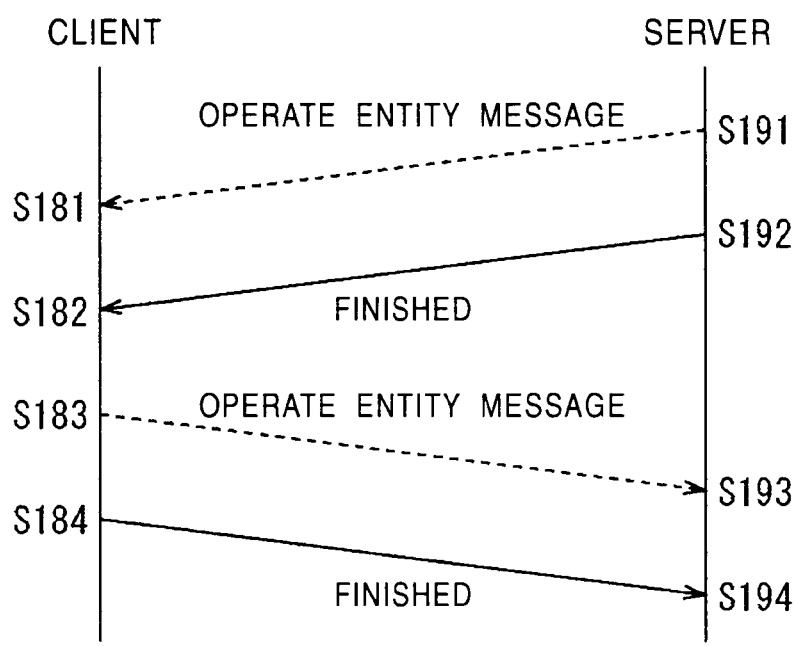
FIG. 19 is a diagram showing a sequence of an operate entity protocol executed using messages shown in FIG. 18.

Referring to a sequence flow shown in FIG. 19, the operate entity protocol, in which messages shown in FIG. 18 are transmitted, is described below.

In step S191, the operate-entity message manager 67 of the server 2 produces a set of meaningful operate-entity messages to be transmitted to the portable telephone 5. The produced operate-entity messages are supplied to the operate-entity message transmission controller 68.

In step S192, the operate-entity message transmission controller 68 of the server 2 adds a finished message to the sequence of the produced messages and transmits a packet including the sequence of messages and the finished message to the portable telephone 5.

The operate-entity messages included in the control packet transmitted to the portable telephone 5 is received in step S181 and the finished message is received in step S182.

In step S183, the operate-entity message manager 97 of the portable telephone 5 produces a response to the operate-entity message received from the server 2, under the control of the controller 81. Whether or not responses are returned and how many responses are returned depend on messages received from the server 2.

In step S184, the operate-entity message transmission controller 65 of the portable telephone 5 adds a finished message to the response produced by the operate-entity message manager 97 and transmits a packet including the response and the finished message to the server 2.

In step S193, the operate-entity messages included in the packet transmitted from the portable telephone 5 are received by the operate-entity message reception controller 69 of the server 2, and the finished message added at the end of the sequence of the operate-entity messages is received in step S194.

The sequence of operate-entity messages transmitted from the portable telephone 5 or the server 2 may include a particular number of application-specific messages (operate-entity extension message specified in the extension field).

As described above, in the neutral state (FIG. 5) after handshaking has been successfully performed between the portable telephone 5 and the server 2, the server 2 takes the initiative in communication. That is, in the neutral state, the server 2 transmits, to the portable telephone 5, messages using the update entity protocol, the application data transfer protocol, or the operate entity protocol (note that communication is started by the server 2 in any of communication sequence using the update entity protocol described above with reference to FIG. 15, communication sequence using the application data transfer protocol described above with reference to FIG. 17, and communication sequence using the operate entity protocol described above with reference to FIG. 19).

That is, in this neutral state, communication is performed not in such a manner that a response is returned from the server 2 to the portable telephone 5 and a device connected to the portable telephone 5 is controlled in accordance with the response, but in such a manner that the device is controlled in accordance with a command directly transmitted from the server 2 to the portable telephone 5.

This means that once communication is established, the server 2 can directly control a device via communication.

Figure 20:
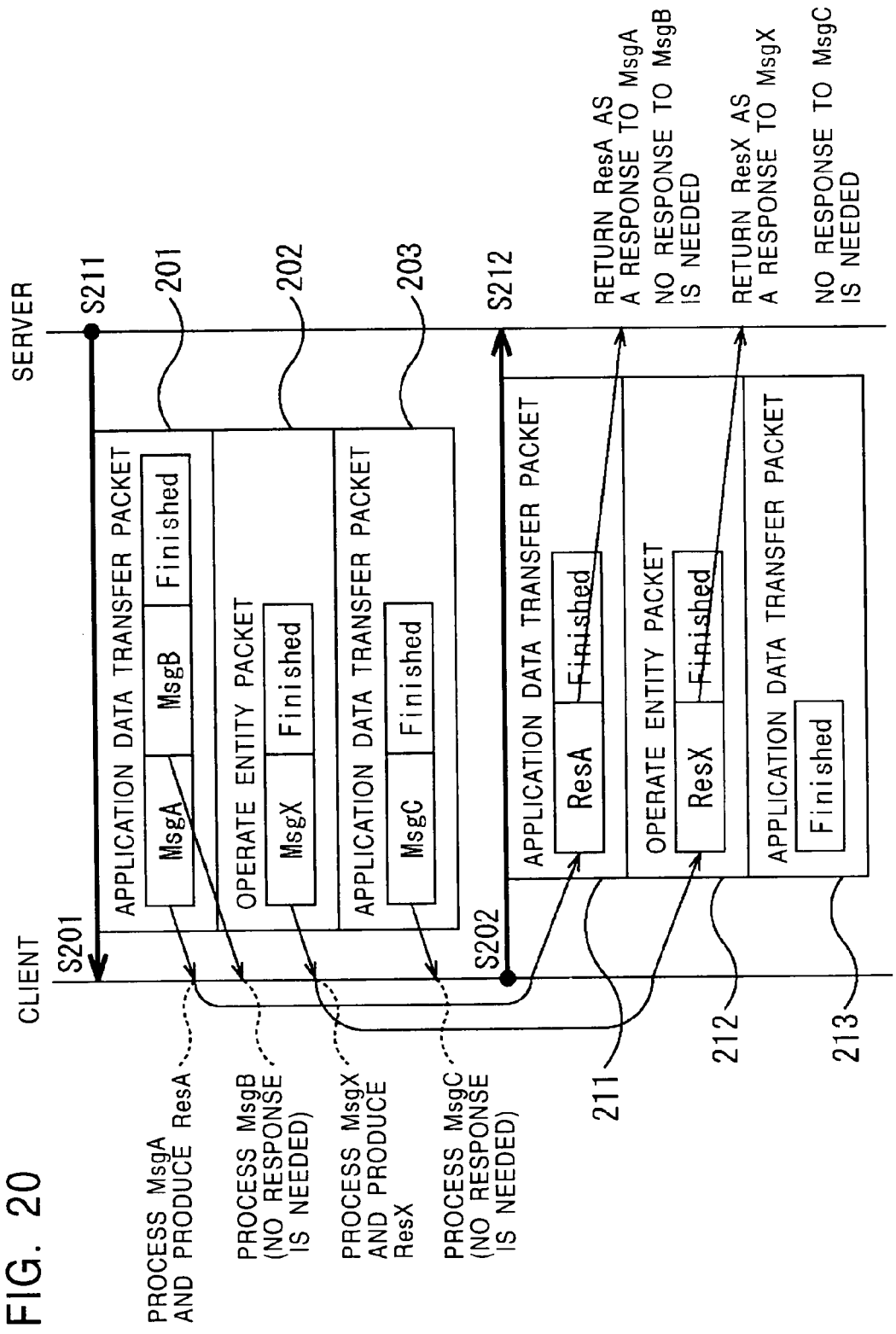
FIG. 20 is a diagram showing a sequence of communication in a neutral state.

Referring to FIG. 20, a sequence of processes performed by a server (server 2) and a client (portable telephone 5) via communication using the above-described subprotocols in the neutral state is described below.

In step S211 in FIG. 20, the server 2 transmits, to the portable telephone 5, a control packet (application-data-transfer packet) 201 including an application-data-transfer message A (MsgA), an application-data-transfer message B (MsgB), and a finished message placed at the end of the sequence of messages MsgA and MsgB.

In communication using the application data transfer protocol, as described above with reference to FIG. 17, the application-data-transfer message transmission controller 62 of the server 2 produces a control packet by adding a finished message at the end of a sequence of a particular number of application-data-transfer messages and transmits the resultant control packet to the portable telephone 5.

In step S211, a control packet (operate entity packet) 202 is produced by adding a finished message at the end of an operate-entity message X (MsgX), and the produced control packet is transmitted from the server 2 to the portable telephone 5.

In communication using the operate entity protocol, as described above with reference to FIG. 19, the server 2 produces a control packet by adding a finished message at the end of a sequence of a particular number of operate-entity messages and transmits the resultant control packet to the portable telephone 5.

Furthermore, in this step S211, a control packet (application data transfer packet) 203 is produced by adding a finished message at the end of an application-data-transfer message C (MsgC), and the produced control packet is transmitted from the server 2 to the portable telephone 5.

As described above, a plurality of control packets are transmitted at a time to the portable telephone 5, and thus the number of times that communication is performed can be reduced compared with the case in which the control packets are transmitted separately.

The messages included in the controls packets transmitted from the server 2 are processed by the portable telephone 5 and responses are produced in the same order as the order in which the messages were transmitted. The responses produced by the portable telephone 5 are returned to the server 2 in the same order as the order in which the responses were produced.

In the example shown in FIG. 20, when the control packets 201 to 203 are received in step S201 by the portable telephone 5, the portable telephone 5 performs processes in accordance with the received messages in the order of the application-data-transfer message A, the application-data-transfer message B, the operate-entity message X, and the application-data-transfer message C.

As described above, if an error occurs in the middle of a process according to a message, whether the following process should be continued or terminated is determined according to the value of the first bit of the message.

In the example shown in FIG. 20, it is assumed that all transmitted messages are performed successfully. The application-data-transfer message A and the operate-entity message X need a response, but the application-data-transfer message B and the application-data-transfer message C doe not need a response.

For a message that must be managed by the server 2 in terms of whether or not the process has been performed successfully by the portable telephone 5, the portable telephone 5 produces a response.

Thus, after the completion of the process according to the application-data-transfer message A, the portable telephone 5 produces, in step S202, a response A (ResA) to the application-data-transfer message A and returns a response packet (application-data-transfer packet) 211 produced by adding a finished message to the response A to the server 2.

In the communication using the application data transfer protocol, as described above with reference to FIG. 17, the application-data-transfer message manager 92 produces a responses to an application-data-transfer message included in the control packet received from the server 2 and returns to the server 2 a response packet including the produced response and a finished message via the application-data-transfer message transmission controller 92.

Furthermore, after completion of the process according to the operate-entity message X, the portable telephone 5 produces, in step S202, a response X (ResX) to the operate-entity message X and returns to the server 2 a response packet (operate-entity packet) 212 produced by adding a finished message to the response X.

In the communication using the operate-entity protocol, as described above with reference to FIG. 19, the operate-entity message manager 97 produces a response to an operate-entity message included in the control packet transmitted from the server 2 and returns a response packet including the produces response and a finished message to the server 2 via the operate-entity message transmission controller 98.

The portable telephone 5 has to return to the server 2 a response packet for each control packet received from the server 2 regardless of whether or not the response packet includes a response message. Therefore, even in the case in which the application-data-transfer message C does not need a response, a response packet (application-data-transfer packet) 213 including only a finished message to the control packet 203 is returned to the server 2 in step S202.

In step 212, the response packet transmitted from the portable telephone 5 is received by the server 2. From the response included in the response packet, the server 2 recognizes that the portable telephone 5 has successfully performed the process according to the message.

As described above, because response messages are produced in the same order as the order in which messages were transmitted from the server 2, the server 2 and the portable telephone 5 can manage transmitted messages and response messages in relation to each other.

Figure 21:
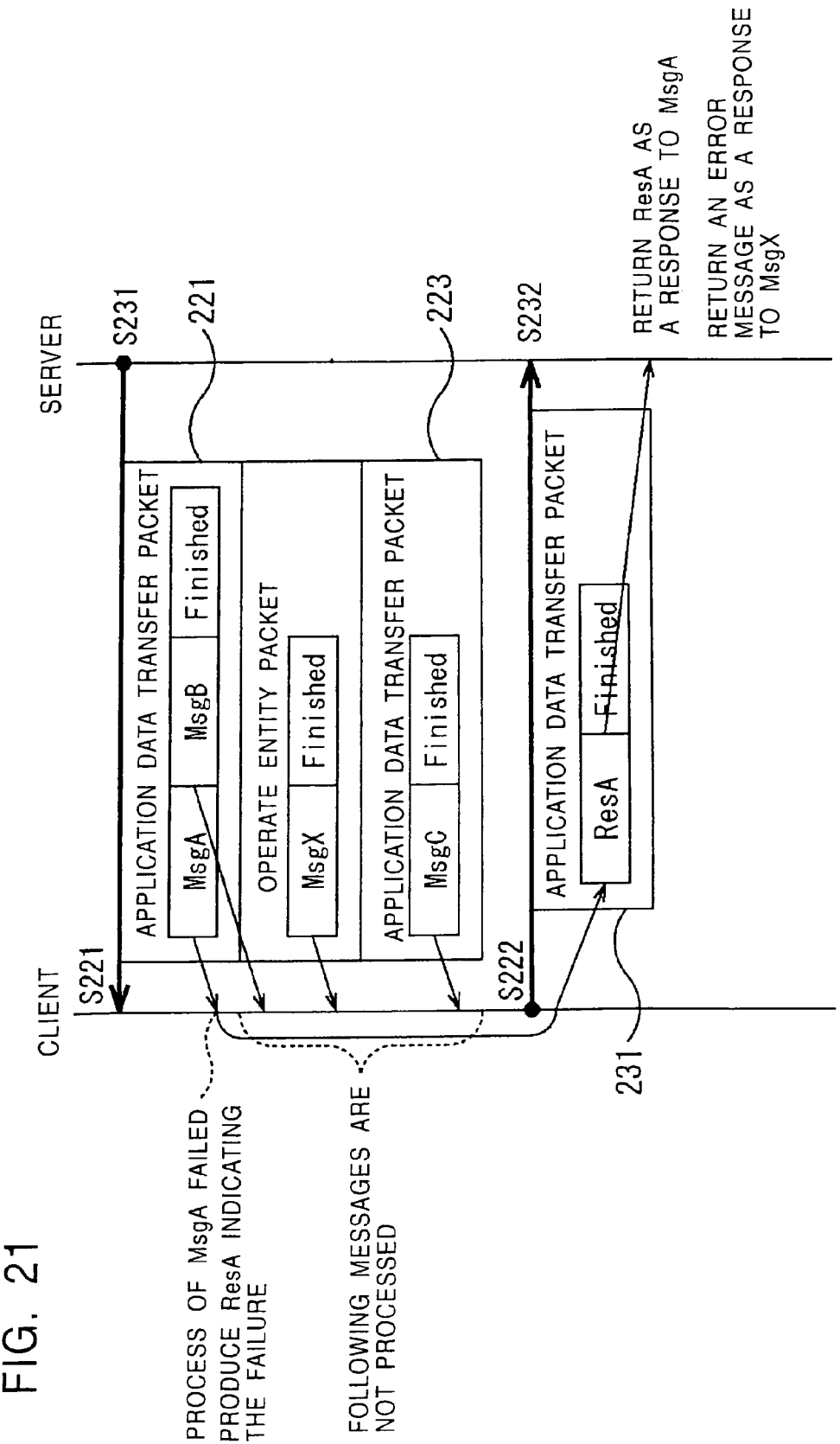
FIG. 21 is a diagram showing another example of sequence of communication in the neutral state.

FIG. 21 shows another sequence of processes performed by the server 2 and the portable telephone 5.

In step S231 in FIG. 21, as in the case of the sequence shown in FIG. 20, control packets 221 and 223 are transmitted from the server 2 to the portable telephone 5.

In the example shown in FIG. 21, it is assumed that the portable telephone 5 fails to perform a process according to an application-data-transfer message A (MsgA) transmitted from the server 2 to the portable telephone 5. Furthermore, it is also assumed that the first bit of the application-data-transfer message A indicates that if a failure occurs in the process of the application-data-transfer message A, the process should be terminated.

Thus, when the portable telephone 5 acquires, in step S221, the application-data-transfer message A included in the control packet 221, if the portable telephone 5 fails to perform the process according to the acquired message, the portable telephone 5 does not perform processes according to following messages, that is, an application-data-transfer message B, an operate-entity message X, and an application-data-transfer message C.

When the portable telephone 5 fails to the process according to the application-data-transfer message A, the portable telephone 5 produces a response A (ResA) to inform the server 2 that the process has been failed. In step S222, the portable telephone 5 produces a response packet (application-data-transfer packet) 231 by adding a finished message to the produced response A and returns the resultant response packet 231 to the server 2.

In step S232, the server 2 receives the response packet 231 transmitted from the portable telephone 5. From the response A included in the response packet 231, the server 2 recognizes that the portable telephone 5 has failed to perform the process according to the application-data-transfer message A. The server 2 also recognizes that processes according to the application-data-transfer message B, the operate-entity message X, and the application-data-transfer message C have not been performed.

Figure 22:
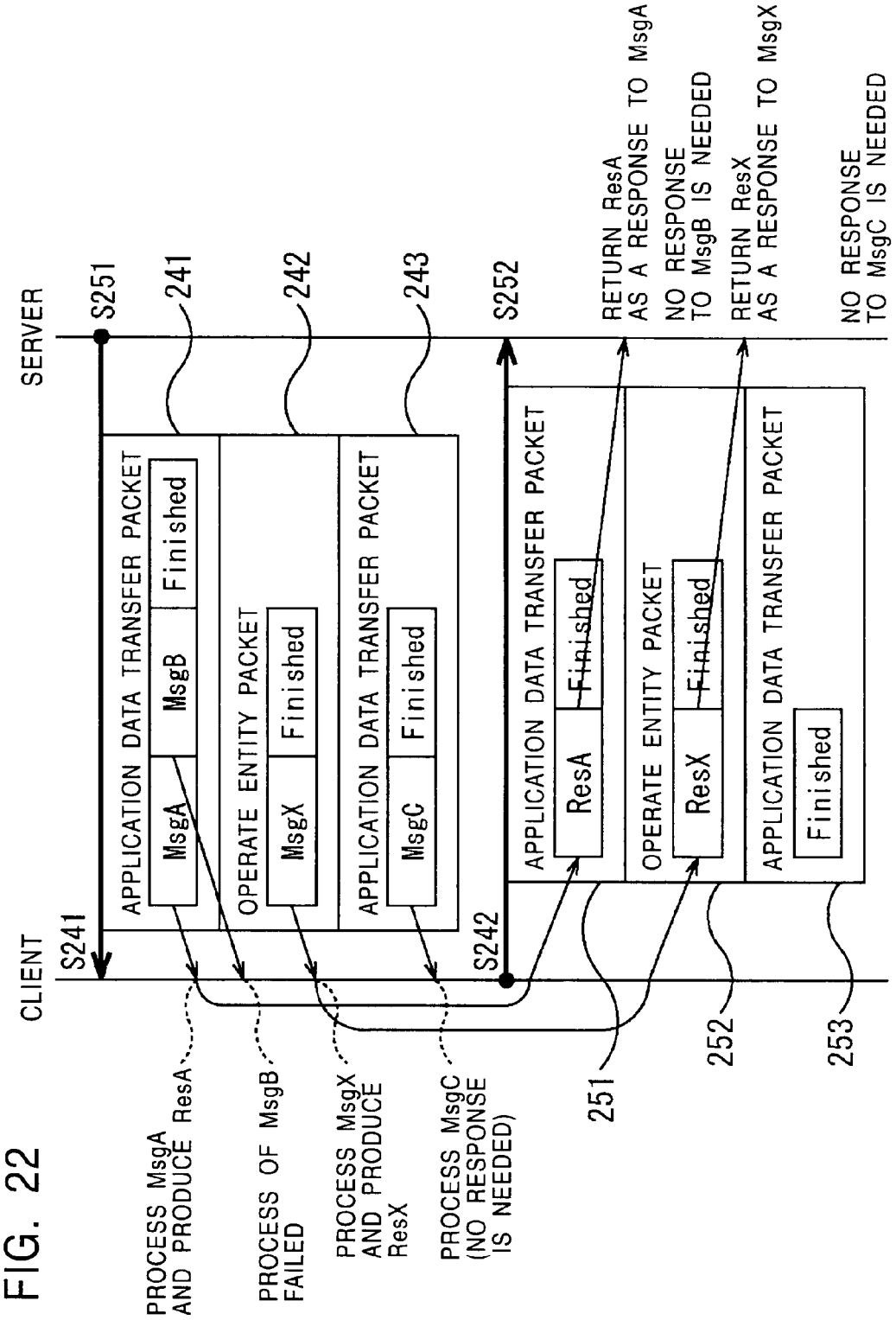
FIG. 22 is a diagram showing still another example of sequence of communication in the neutral state.

FIG. 22 shows another example of a sequence of processes performed by the server 2 and the portable telephone 5.

In step S251 in FIG. 22, as in the case of the sequences shown in FIGS. 20 and 21, control packets 241 and 242 are transmitted from the server 2 to the portable telephone 5.

In the example shown in FIG. 22, it is assumed that the portable telephone 5 fails to perform a process according to an application-data-transfer message B (MsgB) transmitted from the server 2 to the portable telephone 5. Furthermore, it is also assumed that the first bit of the application-data-transfer message B is set so as to indicate that if a failure occurs in the process of the application-data-transfer message B, the process should be continued.

The application-data-transfer message A and the operate-entity message X need a response message, but the application-data-transfer message C does not need a response message.

Thus, in step S241, the portable telephone 5 receives a control packet 241, performs a process according to the application-data-transfer message A, and produces a response A (ResA).

If the portable telephone 5 fails to perform the process according to the next message, that is, the application-data-transfer message B, the portable telephone 5 continues the following process because the first bit of the application-data-transfer message B indicates that the following process should be continued. That is, the portable telephone 5 performs a process according to the operate-entity message X included in the control packet 242 and produces a response X (ResX) to the operate-entity message X.

After completion of producing the response X, the portable telephone 5 performs a process according to the application-data-transfer message C included in the control packet 243.

In step S242, a response packet (application-data-transfer packet) 251 including the response A and a finished packet, a response packet (operate-entity packet) 252 including the response X and a finished packet, and a response packet (application-data-transfer packet) 253 including a finished packet are produced by the portable telephone 5 and returned to the server 2.

In step S252, the response packets transmitted from the portable telephone 5 are received by the server 2. From those response packets, the server 2 recognizes that the processes according to the application-data-transfer message A and the operate-entity message X have been successfully performed by the portable telephone 5 but the process according to the application-data-transfer message B has been failed. Thereafter, the sequence of processes is ended.

In the neutral state, packets are repeatedly transmitted/received between the server 2 and the portable telephone 5 in the above-described manner, and the client (device) is controlled by the server.

Although in the embodiment described above, transmitting of messages to the portable telephone 5 and returning of responses to the server 2 are repeatedly performed to control a particular device, the server 2 may transmit a script (simple program) together with a control packet to the portable telephone 5, and the portable telephone 5 may determine what process to perform next in accordance with the script and the result of the previous process according to the message.

In this case, the script indicates what process should be performed in accordance with which message, depending on a response (response of a device) produced for each message.

After completion of processes according to the script, responses returned from the device to the portable telephone 5 are all described in a response packet and transmitted to the server 2.

On the basis of the script execution history (information indicating in what order what messages were transmitted from the portable telephone 5 to the device (what messages were processed by the portable telephone 5)) transmitted to the server 2, the server 2 can determine which response transmitted from the portable telephone 5 corresponds to which message.

Although in the embodiment described above, after communication is established according to the handshake protocol, communication between the server 2 and the portable telephone 5 is performed under the initiative of the server 2, the portable telephone 5 may take the initiative of communication with a particular timing.

The change in the initiative of communication is performed, for example, using a server-client transmission direction reverse protocol.

For example, when communication is being performed under the initiative of the server 2, if an exchange message is transmitted from the server 2 to the portable telephone 5 using the server-client transmission direction reverse protocol with a particular timing, the following communication is performed in a similar manner as described above but under the initiative of the portable telephone 5.

When communication is being performed under the initiative of the portable telephone 5, if an exchange message is transmitted from the portable telephone 5 to the server 2 using the server-client transmission direction reverse protocol (exchange protocol) with a particular timing, the initiative is transferred to the server 2 and the following communication is performed under the initiative of the server 2.

Figure 23:
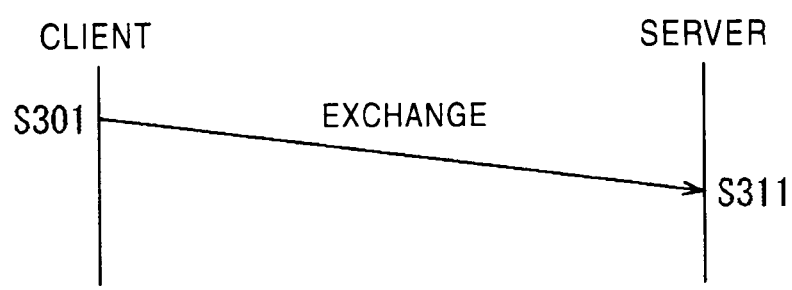
FIG. 23 is a diagram showing a sequence of an exchange protocol.
Figure 24:
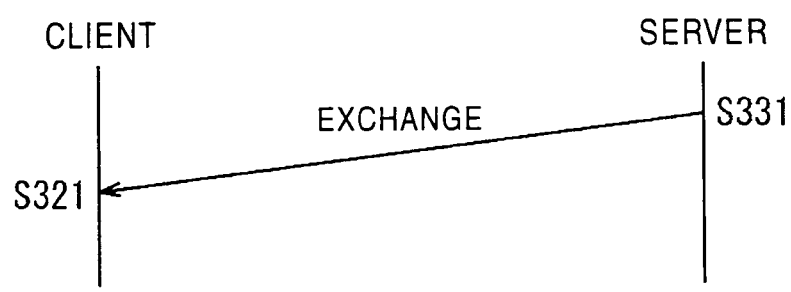
FIG. 24 is a diagram showing a sequence of an exchange protocol.

FIGS. 23 and 24 show exchange protocol sequences.

In the case of the sequence shown in FIG. 23, the portable telephone 5 (client) has the initiative of communication at first. An exchange message is transmitted, in step S301, from the portable telephone 5 and received by the server 2 in step S311. Thereafter, communication between the server 2 and the portable telephone 5 is continued under the initiative of the server 2.

In the case of the sequence shown in FIG. 24, the server 2 has the initiative of communication at first. An exchange message is transmitted, in step S331, from the server 2 and received by the portable telephone 5 in step S321. Thereafter, communication between the server 2 and the portable telephone 5 is continued under the initiative of the portable telephone 5.

The manner in which the initiative of communication is exchanged in the neutral state has been described above.

In the case in which a firewall of the portable telephone 5 exists in the communication channel established between the server 2 and the portable telephone 5, communication between the server 2 and the portable telephone 5 is performed using HTTP via the firewall. In this case, all packets using the protocols described above are transmitted/received in a single session that is maintained during the whole communication.

Figure 5:
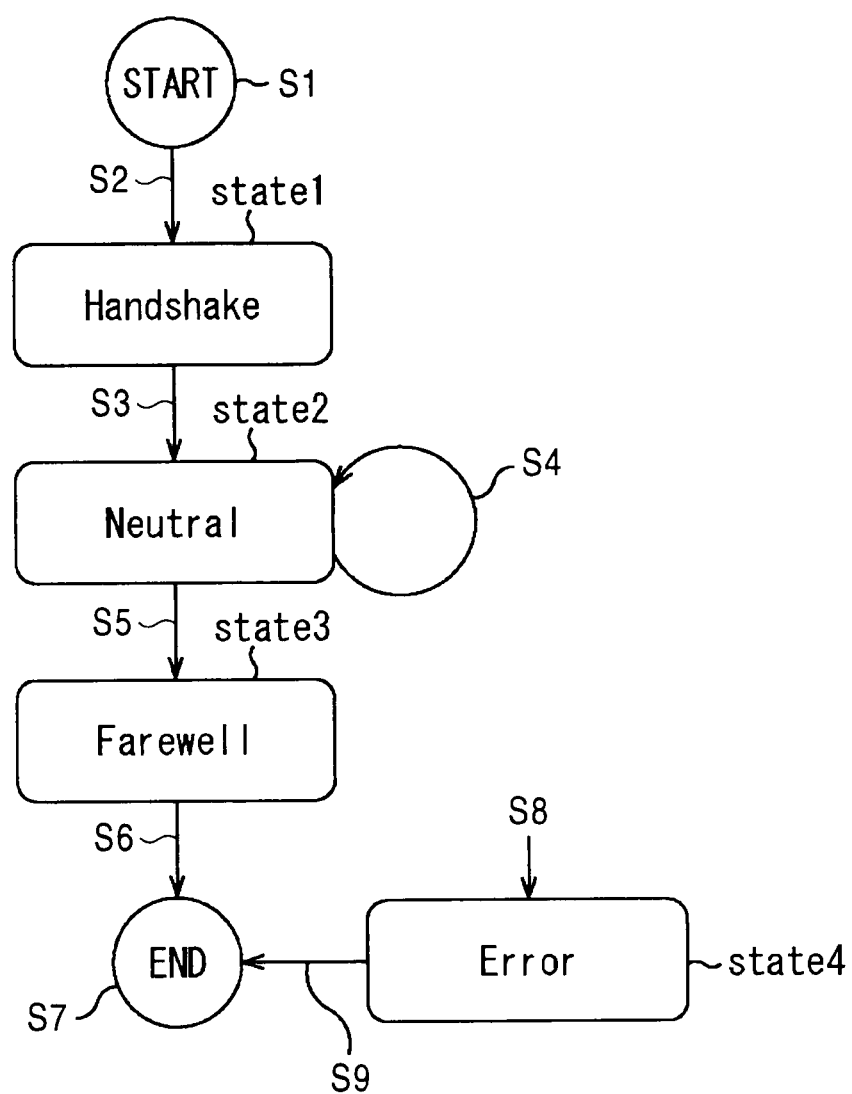
FIG. 5 is a state transition diagram of control protocols.

FIG. 25 shows another example of state transitions of control protocols, which may be employed instead of state transitions shown in FIG. 5. In the following discussion, similar processed to those in FIG. 5 are not described.

In step S343, after completion of the handshake protocol, a client transmits a client-hello-done message to a server. In response, connection is established, and the initiative of the control is transferred to the server.

In step S344, in the neutral state, communication is performed, under the initiative of the server, using an update-entity subprotocol, an update-entity subprotocol, and an operate-entity subprotocol. In this communication, the initiative is transferred, as required, using an exchange message.

If the server determines that the farewell protocol is completed, then, in step S346, the server transmits a server-good-bye-done message to the client and ends the connection. The resource of the client is released and the process is ended.

As described above, the process is also ended by transmitting a server-good-bye-done message.

Figure 26:
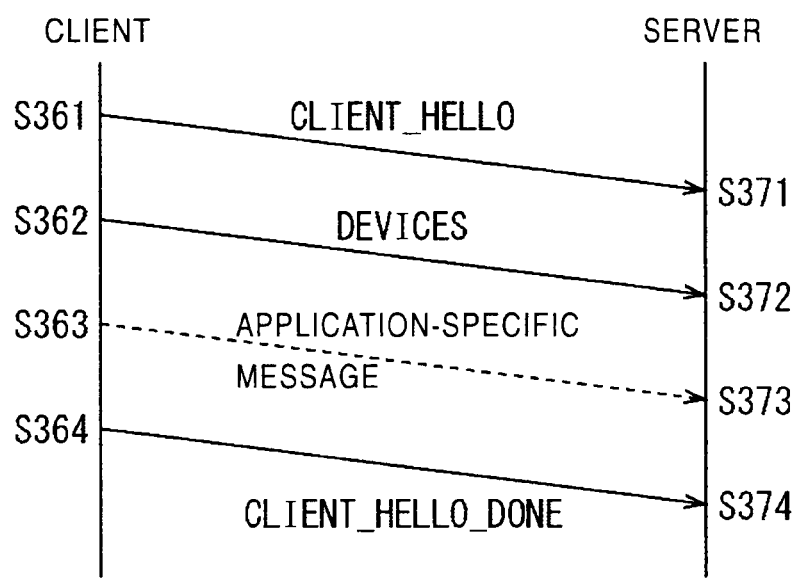
FIG. 26 is a diagram showing another example of a sequence of a handshake protocol.

In the example shown in FIG. 26, the connection is ended when a client-hello-done message is transmitted from a client to a server.

That is, in step S361, a client-hello message is transmitted from a client to a server. In the next step S362, a devices message is transmitted.

In step S363, an application-specific message is transmitted. In the next step S364, a client-hello-done message is transmitted, and connection between the server and the client is established.

Meanwhile, in steps S371 to S374, the server receives the client-hello message, the client-hello message, the application-specific message, and the application-specific message, transmitted from the client.

For example, in the case in which the client is a portable telephone or a similar device, connection between the client and the server may be established via the above-described sequence that is simplified compared with the sequence shown in FIG. 8.

Figure 27:
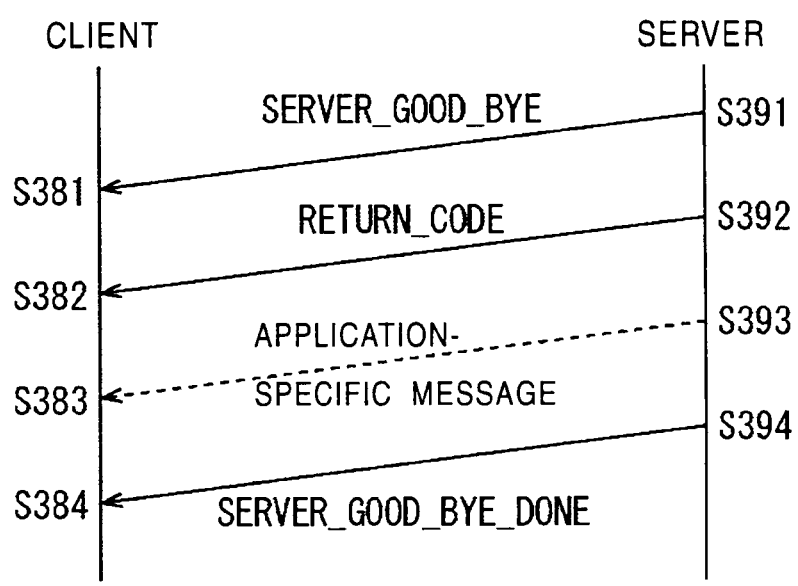
FIG. 27 is a diagram showing another example of a sequence of a farewell protocol.

FIG. 27 shows another example of a sequence in which a farewell protocol is ended when a server-good-bye-done message is transmitted from a server to a client.

In this sequence, the farewell protocol starts when a server transmits a server-good-bye message in step S391. In the next step S392, a return-code message is transmitted. In step S393, an application-specific message is transmitted.

In step S394, the server transmits a server-good-bye-done message to the client, and the connection is closed.

The server-good-bye message, the return-code message, the application-specific message, and the server-good-bye-done message, transmitted from the server, are received by the client in steps S381 to S384. In response to receiving the server-good-bye-done message, the resource of the client is released.

Figure 10:
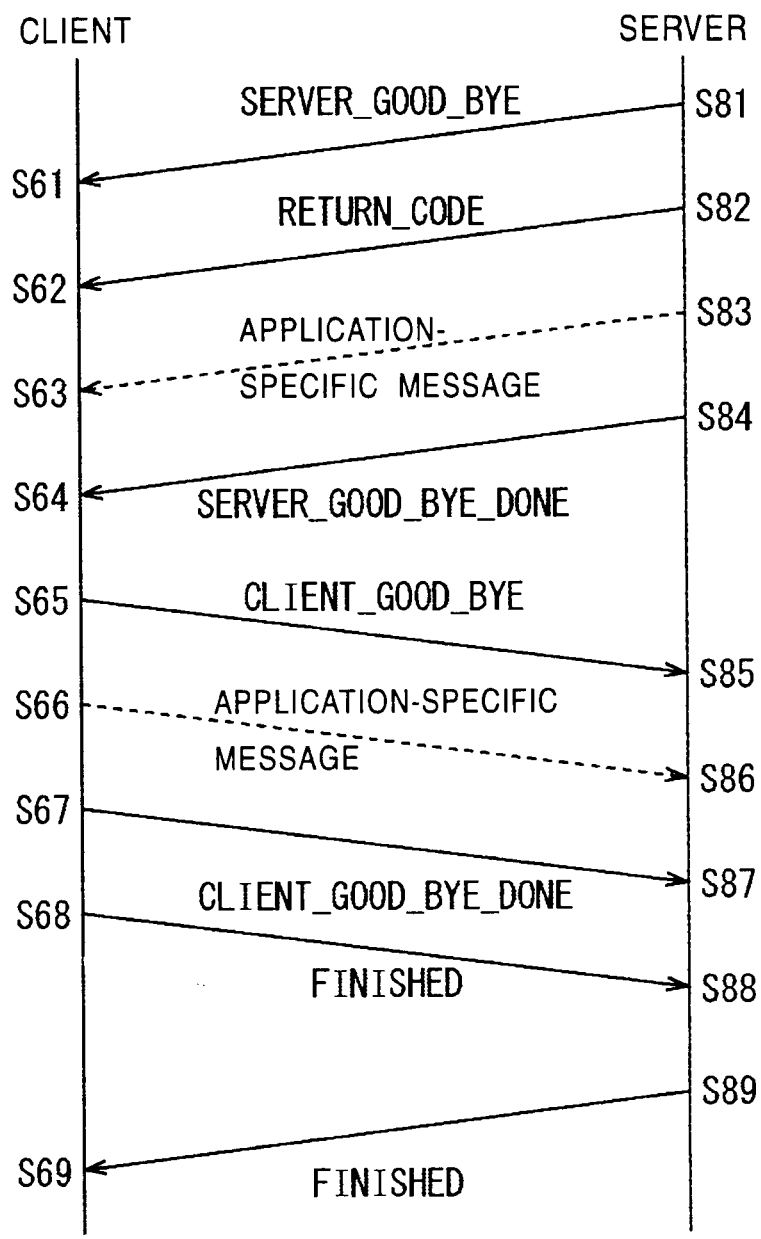
FIG. 10 is a diagram showing a farewell protocol executed using messages shown in FIG. 9.

In the case in which the client is a portable telephone or a similar device, as in the handshake protocol, the connection between the client and the server may be ended via the above-described sequence that is simplified compared with the sequence shown in FIG. 10.

The processing sequence described above may be executed by hardware or software.

When the processing sequence is executed by software, a program forming the software may be installed from a storage medium or via a network onto a computer which is provided as dedicated hardware or may be installed onto a general-purpose computer capable of performing various processes in accordance with various programs installed thereon.

Specific examples of storage media usable for the above purpose include, as shown in FIG. 2, a magnetic disk 41 (such as a floppy disk), an optical disk 42 (such as a CD-ROM (Compact Disk-Read Only Memory) and a DVD (Digital Versatile Disk)), a magnetooptical disk 43 (such as a MD (Mini-Disk (registered trademark))), and a semiconductor memory 44, in the form of a package medium on which a program is stored and which is supplied to a user separately from a computer. A program may also be supplied to a user by preinstalling it on a built-in ROM 32 or a storage unit 38 such as a hard disk disposed in a computer.

In the present description, the steps described in the program stored in the storage medium may be performed either in time sequence in accordance with the order described in the program or in a parallel or separate fashion.

In the present description, the term "system" is used to represent an entire set of apparatuses.

As can be understood from the above description, the present invention provides great advantages. That is, the present invention makes it possible for an information processing apparatus and an information terminal to communicate with each other, in particular, in a manner in which the information processing apparatus takes the initiative of communication.

The present invention makes it possible to transmit/receive various packets in a highly reliable and efficient manner, thereby making it possible for an information processing apparatus to control an information terminal in a highly reliable and efficient manner. The high-efficiency communication allows a reduction in communication cost.

Furthermore, the present invention makes it possible for a client to continue a process even if an error occurs in the middle of the process.

The invention claimed is:

1. An information terminal, comprising:
a communication device configured to perform a first communication using electromagnetic induction;
communication circuitry configured to send to an information processing apparatus a request for establishing a second communication via a network, and to receive a script for controlling the communication device and a plurality of messages from the information processing apparatus via the second communication established in response to the request, each message having an indication of whether a failed processing of the message is to continue with a processing of another message; and
control circuitry configured to control the communication device in accordance with the script received by the communication circuitry,
wherein the information terminal determines what process to perform next based on the script and a result of a previous process in the script, the result at least indicating a successful processing or a failed processing, and a response is sent back to the information processing apparatus after completion of processes according to the script that was transmitted from the information processing apparatus to the information terminal.

2. The information terminal according to claim 1, wherein identification information is assigned to the communication device.

3. The information terminal according to claim 2, wherein the communication circuitry is further configured to send the identification information, and the script includes the identification information.

4. The information terminal according to claim 3, wherein the control circuitry is further configured to control the communication device corresponding to the identification information.

5. The information terminal according to claim 1, wherein a set-property message is transmitted from the information processing apparatus to the communication device, the set-property message configured to set a property of the communication device.

6. The information terminal according to claim 5, wherein a property-set message is sent from the communication device to the information processing apparatus, the property-set message is a response to the set-property message.

7. The information terminal according to claim 6, wherein the property-set message includes a flag indicating whether or not a process set by the set-property message has been successfully performed by the communication device.

8. The information terminal according to claim 5, wherein a get-property message is transmitted from the information processing apparatus to the communication device to acquire the property of the communication device.

9. The information terminal according to claim 1, wherein the communication device is a reader/writer.

10. The information terminal according to claim 1, wherein the information terminal is a mobile phone.

11. A communication method for an information terminal, the method comprising:

performing, with a communication device of the information terminal, a first communication using electromagnetic induction;

sending, with communication circuitry of the information terminal, a request for establishing a second communication to an information processing apparatus via a network;

receiving, with the communication circuitry, a script for controlling the communication device and a plurality of messages from the information processing apparatus via the second communication established in response to the request, each message having an indication of whether a failed processing of the message is to continue with a processing of another message;

controlling, with control circuitry of the information terminal, the communication device in accordance with the script received by the communication circuitry;

determining, with the information terminal, what process to perform next based on the script and a result of a previous process in the script, the result at least indicating a successful processing or a failed processing; and sending a response back to information processing apparatus after completion of processes according to the script that was transmitted from the information processing apparatus to the information terminal.

12. The communication method according to claim 11, further comprising:

assigning identification information to the communication device.

13. The communication method according to claim 12, further comprising:

sending, by the communication circuitry, the identification information.

14. The communication method according to claim 13, further comprising:

controlling the communication device corresponding to the identification information with the control circuitry.

15. The communication method according to claim 12, wherein the script includes the identification information.

* * * * *